United States Patent [19]
Cowen

[11] Patent Number: 5,321,560
[45] Date of Patent: Jun. 14, 1994

[54] EMBEDDED SERVO SYSTEM FOR LOW POWER DISK DRIVES

[75] Inventor: Stephen R. Cowen, Louisville, Colo.

[73] Assignee: Integral Peripherals, Inc., Boulder, Colo.

[21] Appl. No.: 765,348

[22] Filed: Sep. 25, 1991

[51] Int. Cl.$^5$ ................................................. G11B 5/09
[52] U.S. Cl. ........................................ 360/48; 360/51; 360/77.08
[58] Field of Search ................... 360/77, 77.08, 77.11, 360/48, 51, 77.05, 70; 369/47, 48, 49, 50, 276; 371/6, 42

[56] References Cited

U.S. PATENT DOCUMENTS

| | | |
|---|---|---|
| 4,424,543 | 1/1984 | Lewis et al. |
| 4,495,533 | 1/1985 | Chambers. |
| 4,530,019 | 7/1985 | Penniman. |
| 4,578,723 | 3/1986 | Betts et al. ................ 360/77 |
| 4,631,606 | 12/1986 | Sugaya. |
| 4,669,004 | 5/1987 | Moon et al. |
| 4,783,705 | 11/1988 | Moon et al. |
| 4,819,103 | 4/1989 | Okamura ................ 360/51 |
| 4,823,212 | 4/1989 | Knowles et al. ......... 360/77.08 |
| 4,825,310 | 4/1989 | Song ....................... 360/77.08 |
| 4,825,321 | 4/1989 | Hassel et al. |
| 4,920,462 | 4/1990 | Couse et al. |
| 4,933,785 | 6/1990 | Morehouse. |
| 4,979,055 | 12/1990 | Squires et al. |
| 4,979,056 | 12/1990 | Squires et al. |
| 5,025,335 | 6/1991 | Stefansky. |
| 5,041,926 | 8/1991 | Ockerse et al. |
| 5,050,016 | 9/1991 | Squires. |

FOREIGN PATENT DOCUMENTS

WO91/02349 2/1991 PCT Int'l Appl.
WO91/02354 2/1991 PCT Int'l Appl.

OTHER PUBLICATIONS

"Quantum Low Power Products, Technical Highlights", a *Quantum Corp Publication*, Sep. 1990, 9 pages total.

*Primary Examiner*—Aristotelis Psitos
*Assistant Examiner*—P. W. Huber
*Attorney, Agent, or Firm*—Skjerven, Morrill, MacPherson, Franklin & Friel

[57] ABSTRACT

The servo field includes at least one sub-field of prerecorded information that simultaneously provides (i) data for a first servo function and (ii) data for at least one other servo function. In another embodiment, a prerecorded embedded servo field includes a first sub-field of prerecorded information that simultaneously provides (i) automatic gain control data for a third sub-field and (ii) data for a first servo function, and a second sub-field of prerecorded information that simultaneously provides (i) automatic gain control (AGC) data for the third sub-field and (ii) data for a second servo function. Since the first and the second sub-fields in the servo field of this invention are used for AGC and another servo function, the sub-fields are arranged within the servo field so that the sub-field that requires the least precise AGC control is first and the sub-field that requires the most precise AGC control is last. To provide AGC data for the first sub-field in the servo field of this invention, AGC data is contained in a write-to-read transition area of the data region preceding the first servo sub-field. The sector mark field of this invention is immune to single bit errors. Specifically, the sub-field used for synchronization is designed so that servo synchronization timing is not lost due to a single bit error in the synchronization sub-field or in the sub-fields preceding the synchronization sub-field.

10 Claims, 20 Drawing Sheets

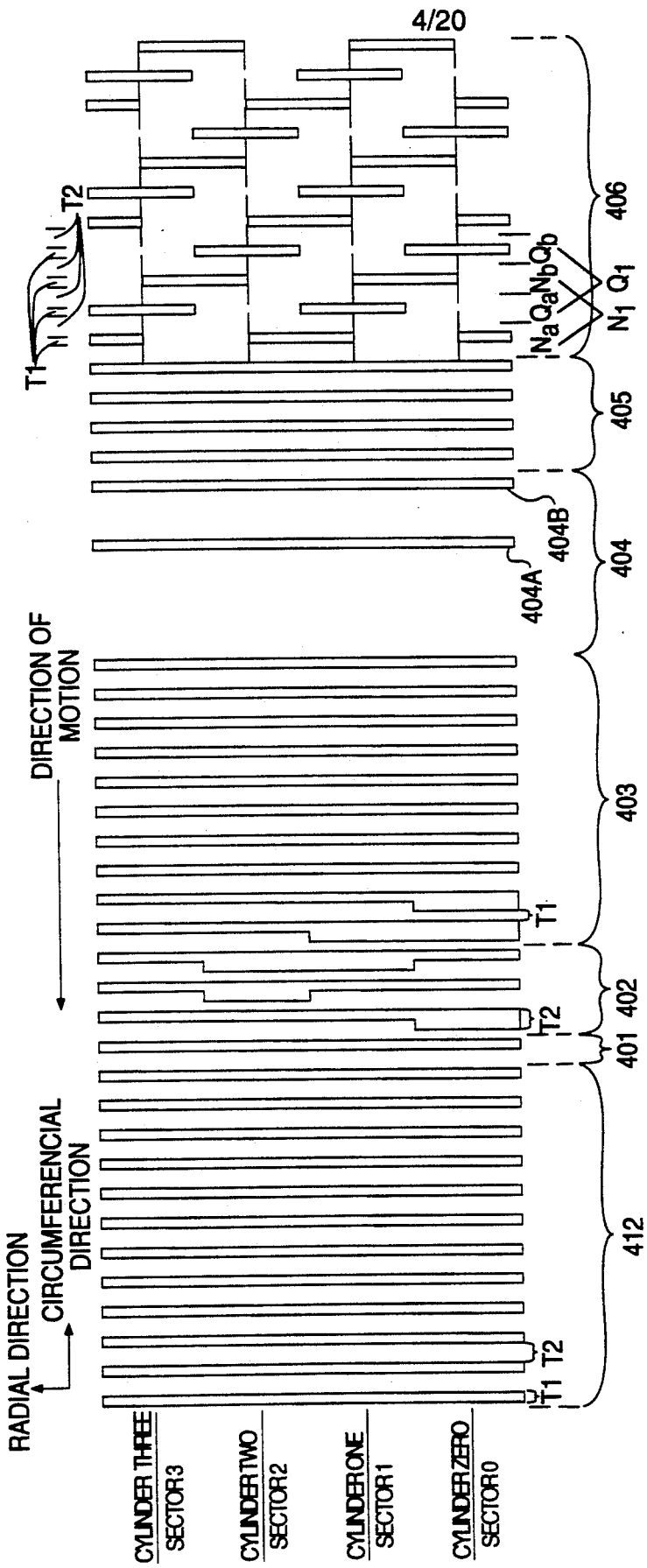
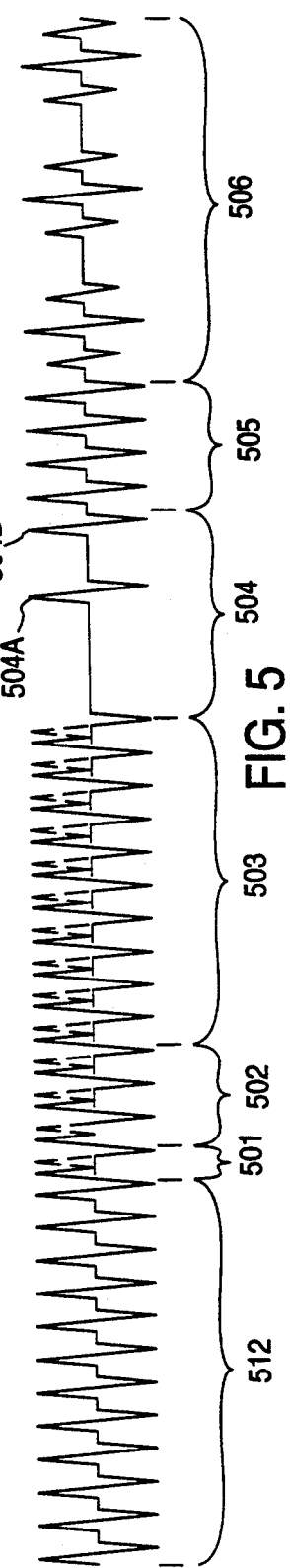
FIG. 4
FIG. 5

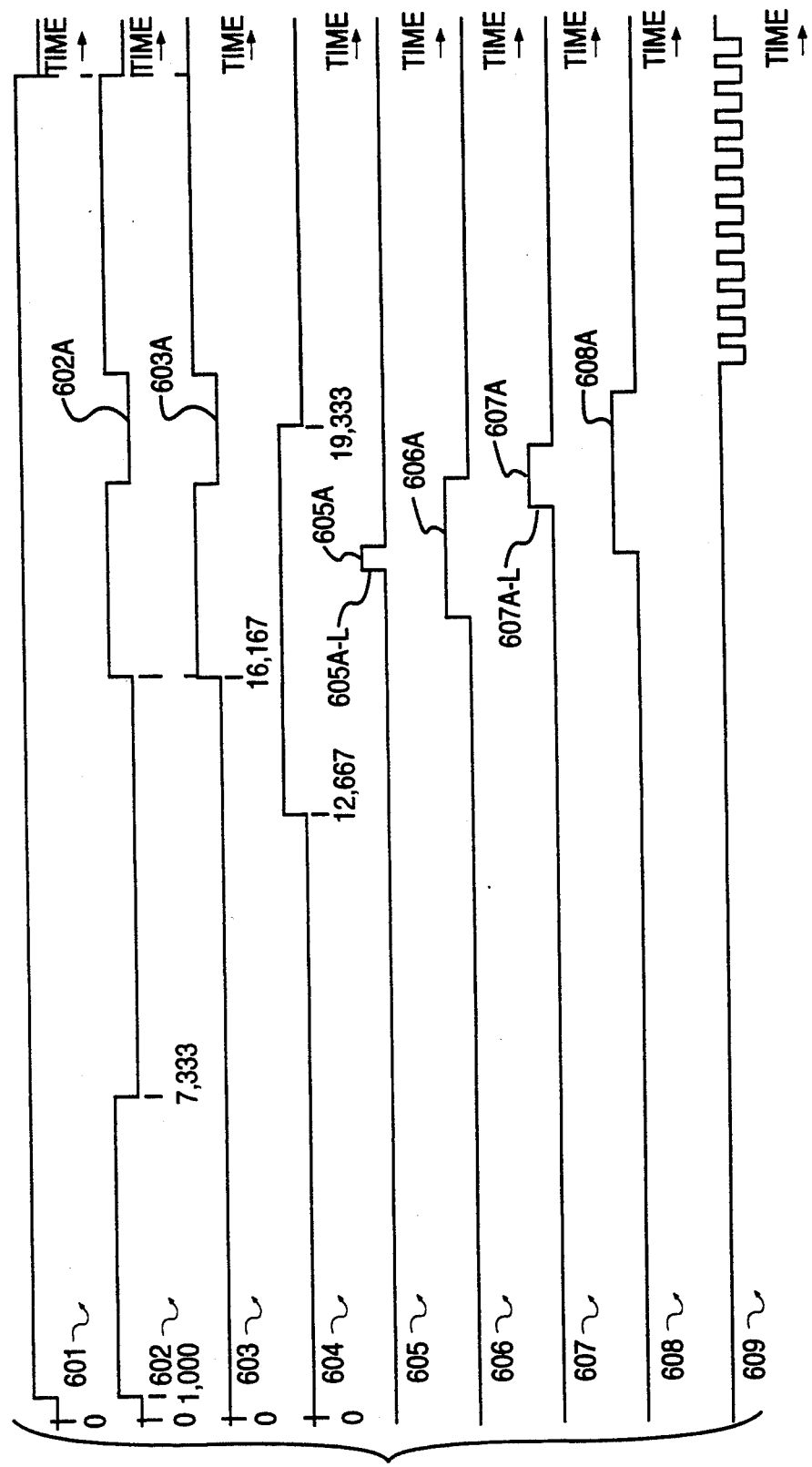

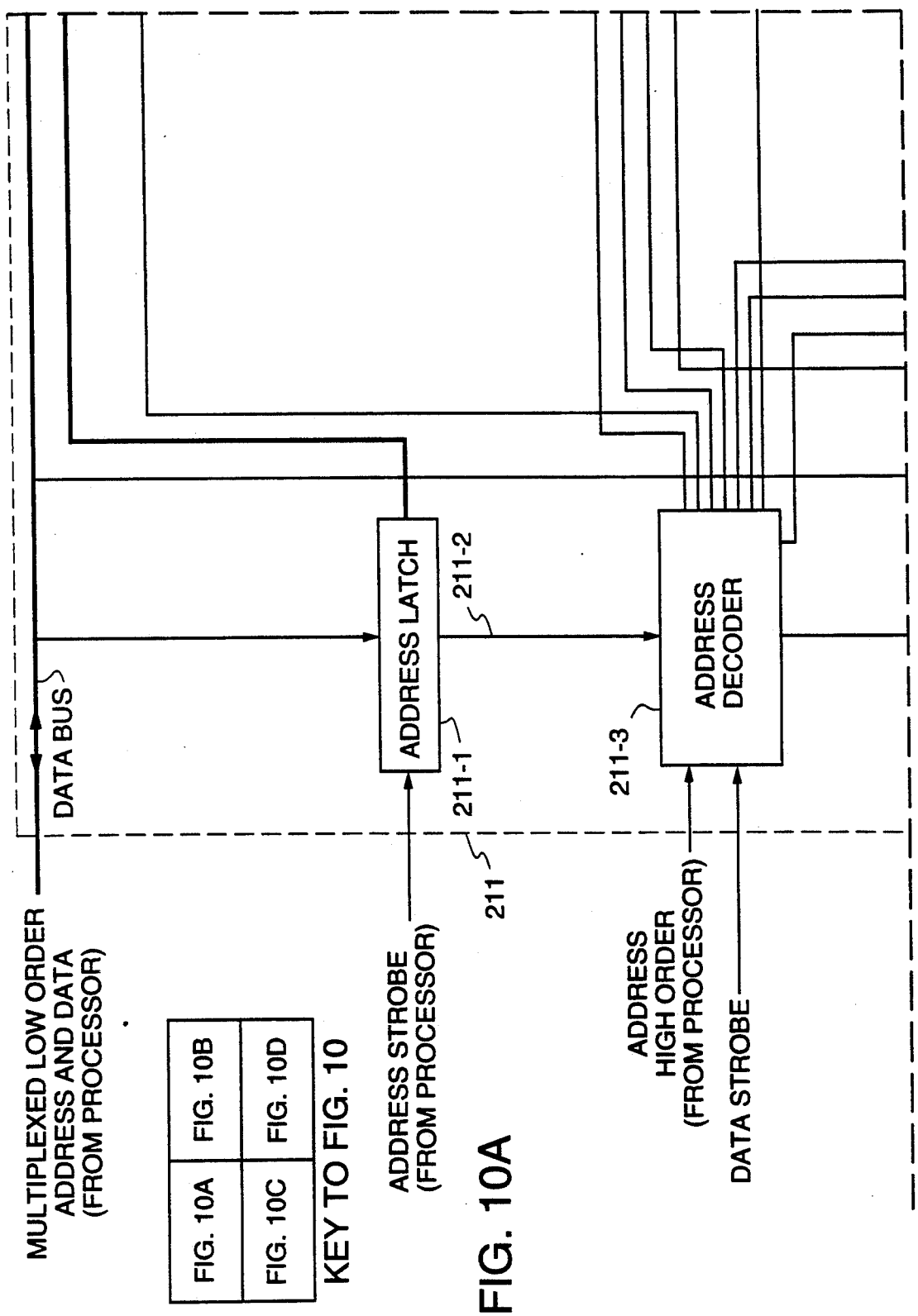

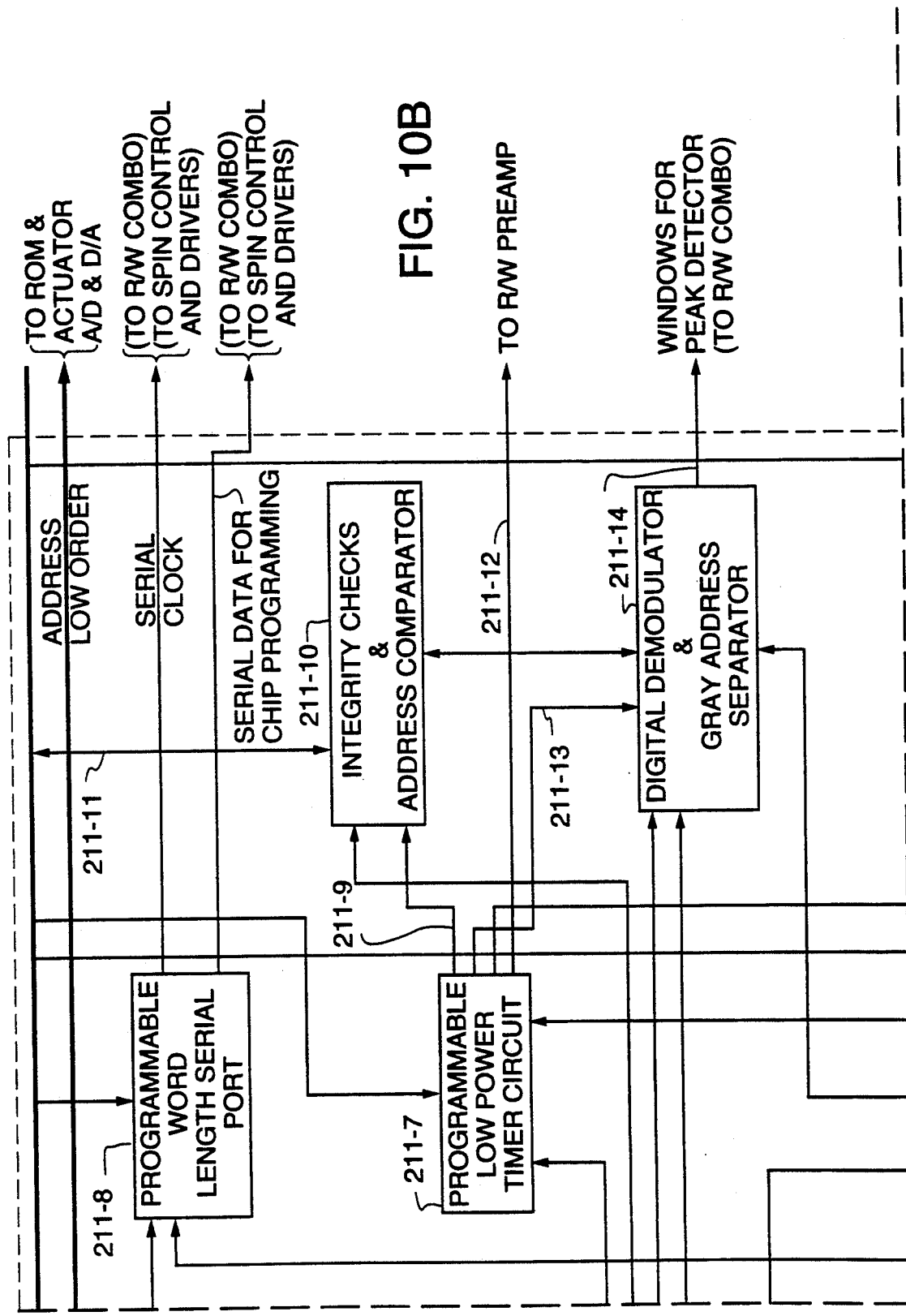

EMBEDDED SERVO SYSTEM FOR LOW POWER DISK DRIVES

BACKGROUND OF THE INVENTION

1. Field of the Invention

This invention relates generally to reading and writing data on a magnetic storage medium and in particular to reading and writing data at a predetermined location on a magnetic storage medium by using servo information embedded within the data.

2. Prior Art

Typically, a disk drive contains one or more circular planar disks that are coated on each side with a magnetic medium. The disk or disks are mounted on a spindle that extends through the center of each disk so that the disks may be rotated at a predetermined speed, usually about 3600 rpm. Usually, one read/write head is associated with each side of the disk that is coated with a magnetic medium. The read/write head flies a small distance above the disk surface as the disk rotates. The read/write head, in response to signals from electronics associated with the disk drive, writes data at a predetermined location in the magnetic medium. Similarly, the read/write head, in response to other signals from the disk drive electronics, reads the data stored at a predetermined location.

The configuration of the data on the magnetic surface is instrumental in the operation of the disk drive. Data are recorded by the read/write head in concentric circular tracks on the disk. Corresponding tracks on different disk surfaces are cylindrically aligned.

Typically, each track is segmented into one or more parts that are referred to as sectors. Thus, the disk drive must move the read/write head radially across the disk surface to locate the track for reading or writing data and then must follow that track circumferentially until the desired sector passes under the read/write head. Hence, the read/write head is positioned at a predetermined radial and circumferential position over the disk surface.

In a disk drive, each read/write head is usually affixed by an arm to an actuator and the actuator is moved so that the read/write head is moved radially to a specified track. This operation is referred to as a track seek, or sometimes just a seek. In an open-loop disk drive, a stepper motor is used to move the actuator while in a closed-loop disk drive a servo system is used to move the actuator.

Many different servo systems have been developed for use in hard disk drives. In a servo system, the read/write head reads a servo pattern contained in a servo field to determine the radial and circumferential position of the read/write head relative to the disk. The information that is read is provided to the disk drive control loop electronics which in turn repositions the read/write head as necessary based on that information. Good servo control is essential for reliable storage and retrieval of data on rotating memory storage devices such as hard disk drives.

The servo pattern within the servo field is the key to good servo control. The servo pattern must provide the control loop electronics with an accurate read/write head position, both radially and circumferentially relative to the disk. Typically, for radial positioning, two sub-fields, i.e., a cylinder address sub-field and a position sub-field, within the servo field have been used. Usually, these sub-fields are positioned adjacent to one another in the servo field.

The cylinder address sub-field contains a Gray code pattern that (i) identifies the track containing the servo field and (ii) is a coarse radial position indicator. The Gray code track number pattern is a set of magnetic dibits that contain the track address. As is known to those skilled in the art, the track addresses are addresses that are encoded using a Gray code sequence so that any decoding uncertainty is limited to plus or minus one half track. With the Gray code, only one bit in the track address changes from track to track.

The position sub-field is usually adjacent to the cylinder address sub-field and consists of a magnetic pattern that generates a series of pulses. The disk drive electronics detects the peak of each of the series of pulses. When the read/write head is radially centered over the track, the peak amplitude of pulses adjacent to and on both sides of the center of the track are equal. The difference between the peak amplitude of adjacent pulses corresponds directly to the amount the read/write head is off from the center of the track. Hence, the position sub-field is a fine radial position locator for the radial positioning of the read/write head.

The circumferential positioning information in the servo field is also broken into course and fine position information. Typically, an index sub-field, that consists of one or more bits, is used as a course locator of a point along the circumference of a track. The index bits usually are used to identify only one sector on a track that may contain for example 72 sectors.

A more precise indicator of circumferential position if provided by the sector mark sub-field within the servo field, which is used to precisely identify the location of each sector in a track. A sector mark bit in the sector mark sub-field is used to generate a signal at a precise location. To locate a particular circumferential position, the number of sector mark signals that occur after an index signal are counted. Since the sector mark signal is a precise circumferential positioning mark, it is used by the disk drive spin control hardware as a tachometer signal to control the speed of the disk relative to the read/write head.

One type of servo system is an embedded servo system where a servo field identifying the circumferential and radial data location is placed in front of each data sector in a track. One example of an embedded servo pattern is given in U.S. Pat. No. 4,823,212 issued to Knowles et al. on Apr. 18, 1989 where each track is divided into an equal number of sectors. Each sector includes a section of servo code, referred to as a servo field 100, at the beginning of the sector. Servo field 100 demonstrates each of the general features discussed above.

Each servo field 100 is the same length and includes, starting at its leading edge, a write splice sub-field 101, an automatic gain control (AGC) sub-field 102, a sector mark sub-field 103, an index sector identifier 104, a defect bit 105, a Gray code track number sub-field 106, and a track position sub-field 107 followed by another write splice sub-field. Servo field 100 is preceded and followed by data regions 110 and 111, respectively. As explained more completely below, AGC sub-field 102 is actually divided into two parts. The first part is a write-to-read transition zone and the second part provides the actual AGC data.

FIG. 1B is a flat view of the magnetic dibits in one servo field in tracks 3 to 6 of the disk. The other servo fields and data fields have the same general structure as illustrated by the block diagram of FIG. 1A. FIG. 1C is the signal pattern generated when the information in track 3 is read.

Write splice sub-fields are used to compensate for disk rotational speed variations so that servo field 100 is not overwritten by data. The AGC portion of automatic gain control sub-field 102 is used to normalize the signals from the read/write head so that subsequent servo information is properly detected and processed. Sector mark sub-field 103 was described above. Index sector sub-field 104 was also described above. Defect bit 105 is used to indicate that the data region associated with servo field 100 is defective. Finally, track position sub-field 107 is used to generate signals that are used for track following, as described above. The relative position of the various sub-fields within servo field 100 are typical for an embedded servo system.

Several different approaches have been used in the track position sub-field of the servo field to encode information that results in accurate track following. For examples of track positioning techniques, see U.S. Pat. No. 4,823,212 issued to Knowles et al. on Apr. 18, 1989; U.S. Pat. No. 4,530,019 issued to Penniman on Jul. 16, 1985; U.S. Pat. No. 4,424,543 issued to Lewis et al. on Jan. 3, 1984; and U.S. Pat. No. 4,669,004 issued to Moon et al. on May 26, 1987, which are incorporated herein by reference in their entirety.

To obtain the position information contained in a servo field 100, the disk drive read channel must be prepared so that the information in servo field 100 is accurately detected and read. Not only must the disk drive read channel be prepared, but also the pattern read must be synchronized with the disk drive detection hardware so that the information in servo field 100 can be read and stored.

There are two factors in preparing the read channel. First, adequate time is required for the automatic gain control circuitry to adjust for gain differences between the gain in the prior operation and the gain in servo field 100. Second, if servo field 100 follows a write operation, a write-to-read settling time is required for the disk drive electronics to shift the mode of operation.

Another important factor in AGC control is the amount of AGC data in the servo field. For example, AGC field 102 includes 63 bits of AGC data where a bit is defined as the minimum period of time between adjacent peaks of opposite polarity in the signal trace (FIG. 1C). However, only thirty-six of these bits are actually used for AGC control. (See FIG. 6B of U.S. Pat. No. 4,823,212 of Knowles and Kier issued on Apr. 18, 1989.) The other twenty-seven bits are used for write-to-read settling and are not used for AGC.

In low power computers, the power to the disk drive read channel is frequently turned off over the data region of each sector when the disk drive is idle. When the read channel is turned off, the AGC level is lost. Typically, thirty-six bits of AGC data are insufficient to reestablish an accurate AGC level. Thus, while servo pattern 100 is adequate for larger disk drives that have other than a battery power supply, the pattern will not provide reliable AGC levels for battery powered disk drives that power down the read channel.

The embedded servco patterns are written on the same disk real estate that is used for data storage. Consequently, increasing the AGC field to permit reduced power operation limits the amount of data that can be stored on the disk. While this problem is widely recognized, the accuracy required for radial and circumferential positioning has required that such overhead be absorbed.

SUMMARY OF THE INVENTION

Unlike the prior art embedded servo systems, the prerecorded embedded servo fields of this invention has about the same size as prior art servo fields while providing an enhanced level of functionality. The servo field of this invention includes at least one sub-field of prerecorded information that simultaneously provides (i) data for a first servo function and (ii) data for at least one other servo function. Hence, the embedded servo system overhead is reduced by using at least one sub-field in an embedded servo field for two servo functions simultaneously. Preferably, the at least one sub-field is used for automatic gain control and one other servo function so that the servo data available for automatic gain control is increased without increasing the servo field overhead.

In another embodiment of this invention, a prerecorded embedded servo field includes a first sub-field of prerecorded information that simultaneously provides (i) automatic gain control data for a third sub-field and (ii) data for a first servo function, and a second sub-field of prerecorded information that simultaneously provides (i) automatic gain control (AGC) data for the third sub-field and (ii) data for a second servo function. Since the first and second sub-fields provide prerecorded data for a first and a second servo function respectively as well as AGC data for the third sub-field, the servo overhead is about the same as prior art systems but the data available for AGC control is significantly increased. Consequently, the servo field of this invention is ideal for low power disk drives where the read channel is turned off over the data region of each sector.

Since a first and a second sub-field in the servo field of this invention are used for AGC and another servo function, the sub-fields are arranged within the servo field so that the sub-field that requires the least precise AGC control is first and the sub-field that requires the most precise AGC control is last.

To provide AGC data for the first sub-field in the servo field of this invention, AGC data is contained in a write-to-read transition area of the data region preceding the first servo sub-field. Further, the integrity of the AGC data in the write-to-read transition area is protected by a servo field write protect signal. The AGC data in the write-to-read transition area is utilized in all modes of operation of the disk drive except when the disk drive changes from the write mode to the read mode, i.e., following a write mode.

In a preferred embodiment of this invention, a prerecorded embedded servo field includes a cylinder address sub-field that is separated from a position sub-field. Further, the cylinder address sub-field not only provides a track address but also is AGC data for the position sub-field.

According to the principles of this invention, each sector servo field in a track includes an index sub-field that contains a plurality of data bits. The number of data bits in the plurality is selected so that each sector in the track is uniquely identified by the code contained in the index sub-field for that sector. In the preferred embodiment, the index sub-field is adjacent to the cylinder address sub-field but separated from the position subfield so that both the index and cylinder sub-fields provide AGC data for the position sub-field.

In one embodiment, the novel embedded servo field of this invention includes a first automatic gain control (AGC) sub-field, an index/AGC sub-field, a cylinder address/AGC sub-field, a sector mark sub-field, a second automatic gain control sub-field, and a position sub-field that each include prerecorded servo data. This servo field is used for each sector in a track. The index/AGC and cylinder address/AGC sub-fields provide index and track address data concurrently with automatic gain control data. Further, the sub-fields are ordered so that the sub-field requiring the least precision in AGC control, i.e., the index/AGC sub-field, is first and the sub-field requiring the most precision in AGC control, i.e., the position sub-field, is last within the servo field.

The sector mark field of this invention is immune to single bit errors. Specifically, the sub-field used for synchronization is designed so that servo synchronization timing is not lost due to a single bit error in the synchronization sub-field or in the sub-fields preceding the synchronization sub-field.

BRIEF DESCRIPTION OF THE DRAWINGS

FIG. 4 illustrates one embodiment of a magnetization pattern of the servo field according to the principles of this invention.

FIG. 5 illustrates one embodiment of a signal trace generated when the head is positioned over the track centerline of the servo field according to the principles of this invention.

FIG. 6 is a timing diagram for signals used in conjunction with the servo field of this invention.

Figures 7E, 7F:
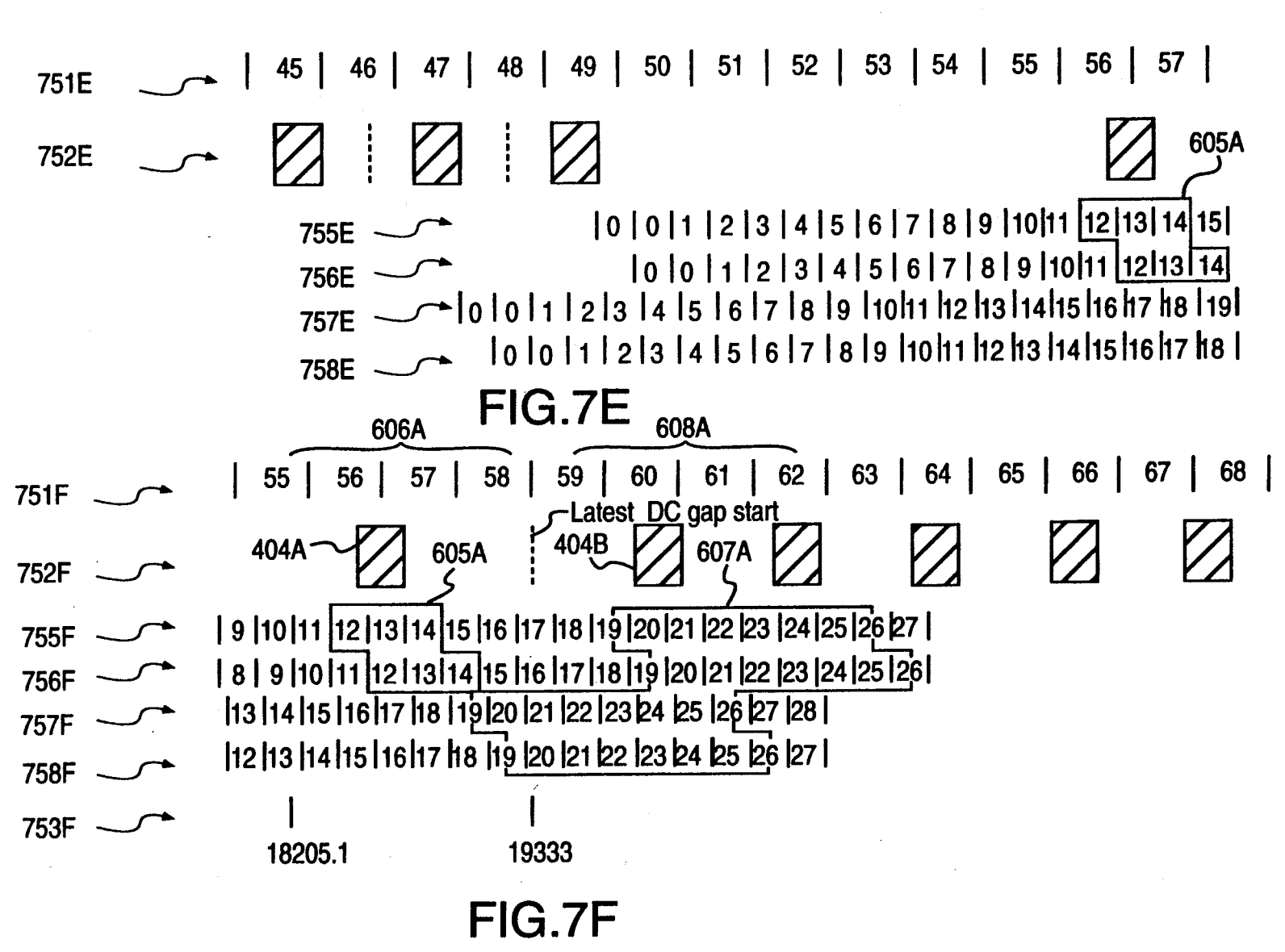

FIG. 7A to 7H are a scale drawing of the magnetization pattern for one servo field of this invention that includes timing information for the various signals used to detect the servo information.

FIGS. 10A to 10D are a block diagram of one embodiment of a gate array suitable for use in a disk drive having the novel interleaved embedded servo system of this invention.

DETAILED DESCRIPTION

Figure 1:
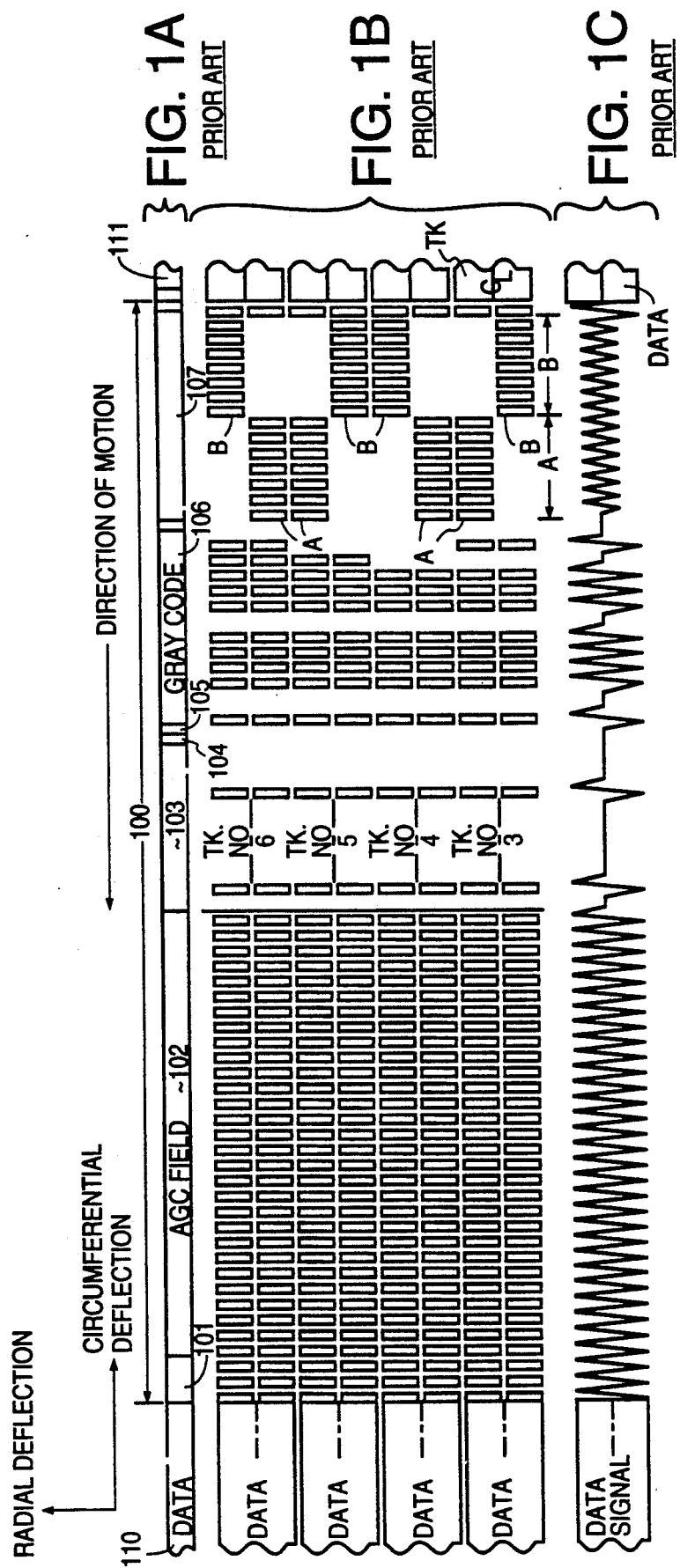
FIG. 1A is a linear representation of a prior art servo field.
FIG. 1B illustrates a typical magnetization pattern for the prior art servo field of FIG. 1A.
FIG. 1C is the signal trace associated with the magnetization pattern for track 3 in FIG. 1B.
Figure 2:
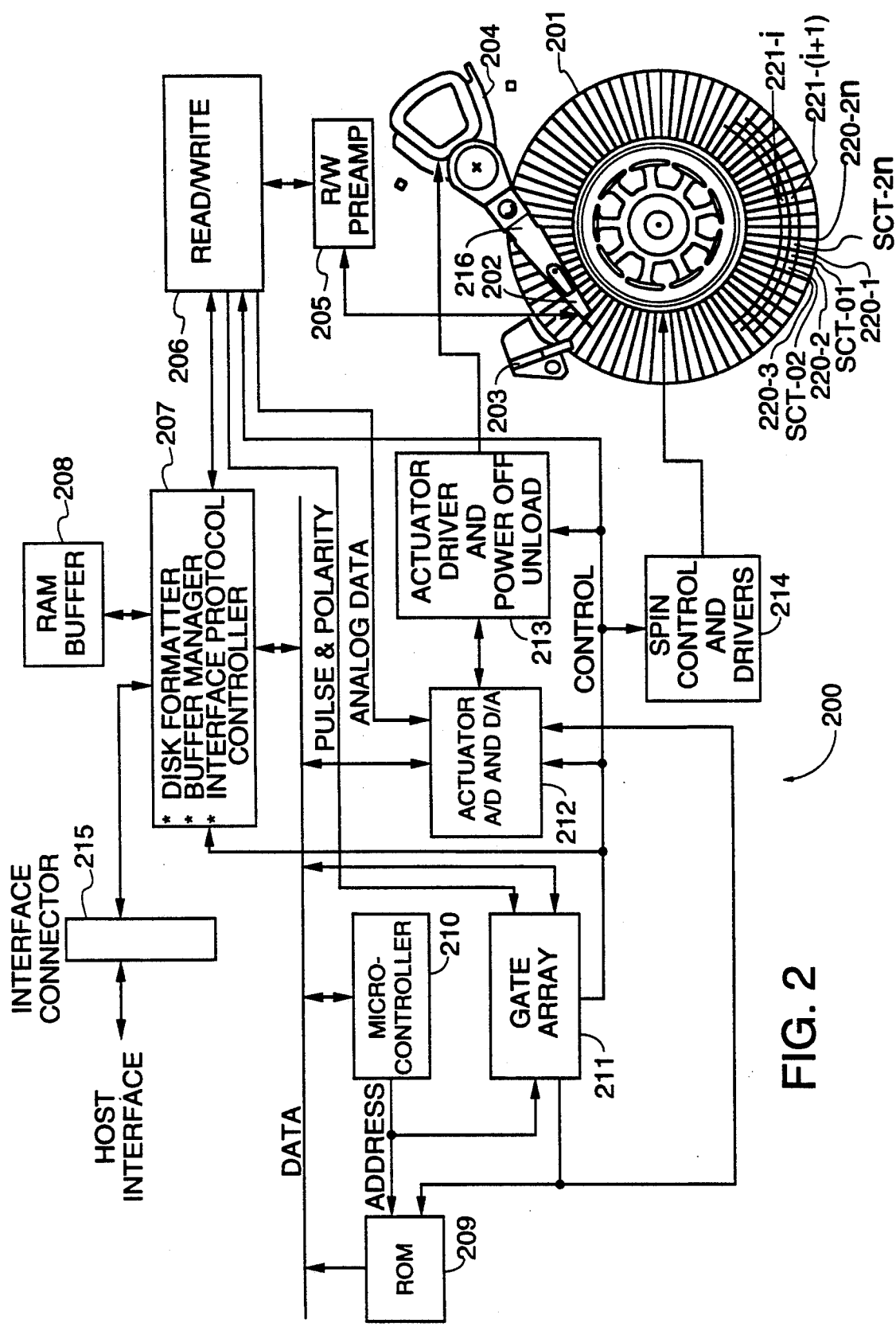
FIG. 2 illustrates a disk drive that includes a disk having the embedded servo system of this invention.

According to the principles of this invention, a novel embedded servo system is used in a disk drive 200 (FIG. 2). The interface of a disk drive with a computer system and in particular the electronics required in conjunction with an embedded servo system to read and write data on disks 201 in response to signals from a disk controller to interface connection 215 are known to those skilled in the art. One embodiment of a system such as that illustrated in FIG. 2 is described more completely in copending and commonly assigned U.S. patent application No. 07/766,480 of Morehouse et al. filed on Sep. 25, 1991 and entitled "Microminiature Hard Disk Drive," which is incorporated herein by reference in its entirety.

As illustrated in FIG. 2, disk drive 200 contains one or more circular planar disks 201. Each disk is coated on at least one side with a magnetic medium as on the prior art disk. Data are recorded by read/write head 202 in concentric circular tracks on the disk, e.g. tracks 221-i and 221-(i+1). Corresponding tracks on different disk surfaces are approximately cylindrically aligned.

Each track is segmented into one or more sectors SCT-01, SCT-02, ..., SCT-n by prerecorded information in embedded servo field regions 220-1 through 220-n. Each servo field region 220-j where j=1, 2, ..., n, includes m servo fields, where m is the number of concentric circular data tracks on disk, i.e., one servo field in each data track at position j for a total of nm servo fields per surface. In one embodiment, as described more completely below, disks 201 are 1.89 inches (48 mm) in diameter and have 632 data tracks. The disk drive of this embodiment is described in copending and commonly assigned U.S. patent application No. 07/629,948 of Morehouse et al. filed on Dec. 19, 1990 and entitled "Miniature Hard Disk Drive For Portable Computers," which is incorporated herein by reference in its entirety.

Unlike the prior art embedded servo systems where each data field had a write-to-read transition region and each prerecorded servo field had only one AGC sub-field, the prerecorded embedded servo fields of this invention have substantially enhanced the amount of AGC data available without either increasing the servo field overhead or decreasing the seek and track following performance of the disk drive. This is accomplished by using various sub-fields within the servo field of this invention for two functions concurrently, as described more completely below.

Briefly, a first sub-field provides data for positioning the read/write head and the first sub-field is simultaneously used as an AGC field for a second sub-field. Thus, the first sub-field performs two servo functions simultaneously. Further, in one embodiment of the servo field of this invention, the cylinder address sub-field and the position sub-field are no longer adjacent to one another in contrast to the prior art servo fields.

Servo field 300 of this invention is a full track address servo field. In a preferred embodiment, servo field 300 includes, in one embodiment, six sub-fields which are: 1) a first automatic gain control recovery sub-field 301; 2) an index/AGC sub-field 302; 3) a cylinder address/AGC sub-field 303; 4) a sector mark sub-field 304; 5) a second automatic gain control sub-field 305; and 6) a position sub-field 306.

A typical magnetization pattern 400 for each of the sub-fields of servo field 300 is illustrated in FIG. 4. In FIG. 4, the direction of rotation of the disk is shown and four arbitrary tracks are shown and arbitrarily labeled as "cylinder 0" to "cylinder 3." The polarity of the magnetization pattern in FIG. 4 is illustrative only of one embodiment of the invention and is not intended to limit the polarity to that shown. As is well-known to those skilled in the art, the magnetization pattern works equally well in either polarity. A detailed expansion for one track of magnetization pattern 400 is illustrated in FIGS. 7A to 7H, which are drawn to scale and described more completely below.

FIG. 5 illustrates a typical waveform 500 generated by magnetization pattern 400 for servo field 300 when the read/write head is precisely on the track center-line. Waveform 500 is also explained more completely below. FIGS. 4 and 5 illustrate several important aspects of this invention. First, the magnetization pattern is continuous between tracks. The continuity provides reliable AGC data during seeks when the read/write head is off a track centerline.

Second, all patterns that provide AGC data and position sub-field 306 have two time periods, i.e., time period T1 and time period T2, where time period T1 is defined as the time interval from a peak of a first polarity to a peak of a second polarity. Time period T2 is an integer multiple of time period T1. If two peaks occur in the first time period, e.g., the signal trace goes from a positive peak to a negative peak, the negative peak is used to generate a clock pulse. Following a clock pulse, data is recorded in a second time period. The second time period is T2. Thus, the combination of a clock pulse and a data bit is repeated in the pattern with a period of period T1 plus period T2. In this embodiment, clock pulses are negative pulses and data pulses are positive pulses. The polarity of the clock and data pulses is arbitrary and either polarity will work so long as the clock pulses and the data pulses are of opposite polarity.

The trace of the data pulse within second period T2 determines whether the data represents a logic one or a logic zero. Specifically, the location of the positive peak within period T2 determines whether the data is a one or a zero. If the positive peak occurs before three quarters of period T2, the data is a one. One data pulses are indicated by the solid line waveform in sub-fields 502 and 503 in FIG. 5. Conversely, if the positive peak occurs at or after three quarters of period T2, the data is a zero. Zero data pulses are indicated by the broken line waveform in sub-fields 502 and 503 in FIG. 5.

In addition to the novel servo field of this invention, the write-to-read recovery field at the end of each data region is utilized for additional AGC data in all modes of operation except following a write, as described more completely below. The use of the write-to-read recovery field for AGC data aids in providing additional AGC margin without increasing the servo field overhead. While the prior art servo field 100 included AGC data in the write-to-read recovery field, the AGC data was not utilized. Consequently, the prior art failed to recognize the advantages gained through the use of the write-to-read recovery field for AGC.

Figure 3:
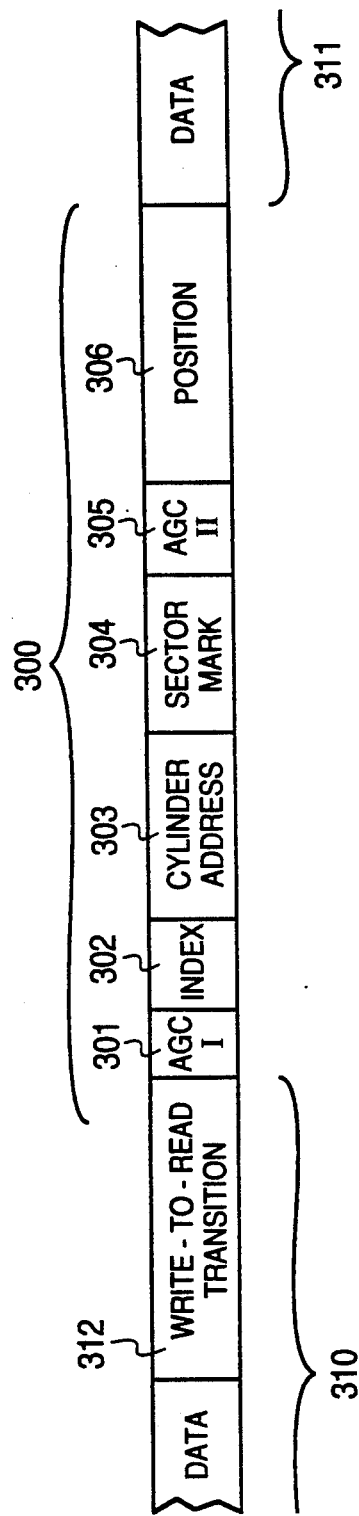
FIG. 3 is a linear representation of one embodiment of the embedded servo field according to the principles of this invention.
Figure 7A:
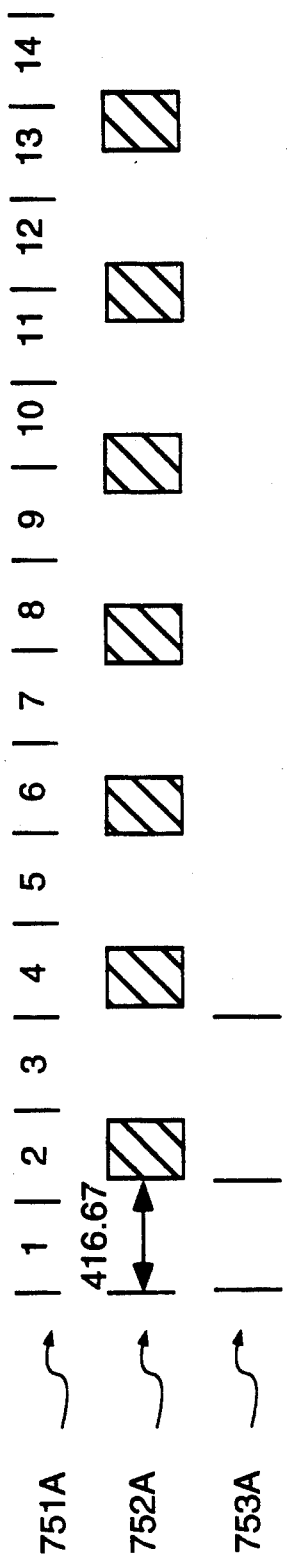
Figure 7B:
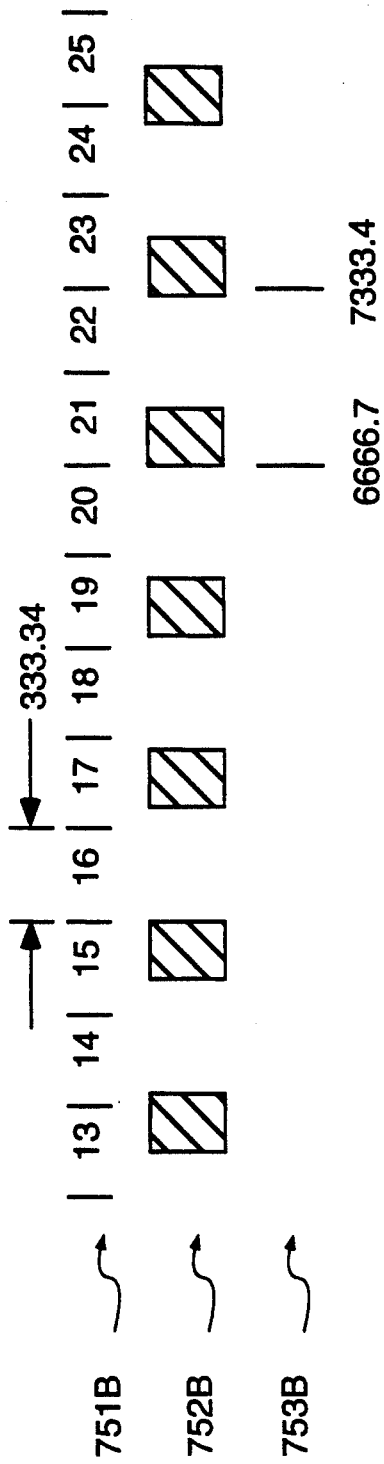
Figure 7C:
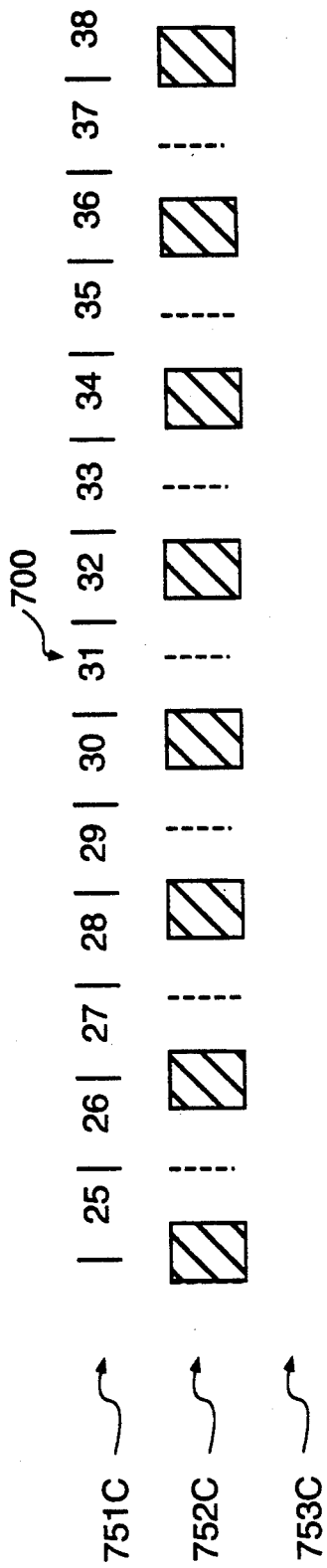
Figure 7D:
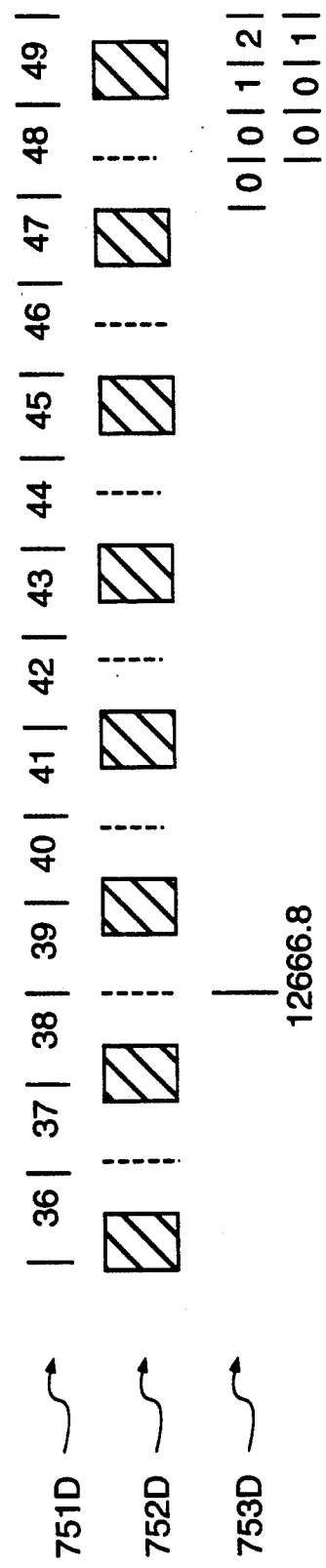
Figure 7G:
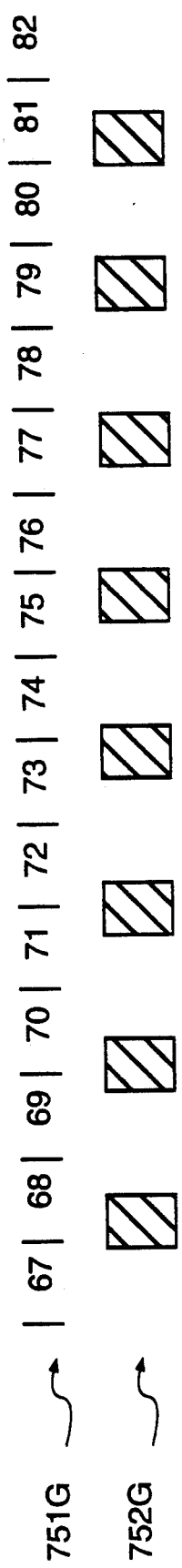
Figure 7H:
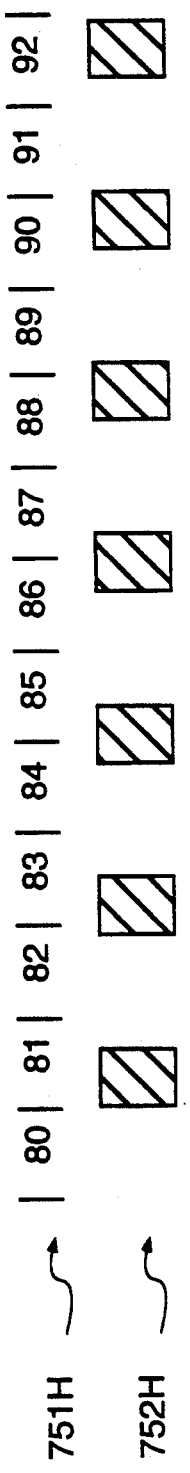

AGC sub-field 301 (FIG. 3) is in this embodiment four bits in length where one bit corresponds to the first time period T1. Hereinafter, a reference to the length of a servo pattern sub-field in bits means a time period equal to time period T1. The "bit" used in defining the sub-field length should not be confused with a data bit. As explained more completely below, index/AGC sub-field 302 and cylinder address/AGC sub-field 303 provide both index and cylinder address information concurrently with AGC data. First AGC sub-field 301 provides additional AGC margin. In another embodiment, first AGC sub-field 301 is not utilized and AGC depends solely on sub-fields 302 and 303. FIG. 5 illustrates waveform 501 generated by magnetic pattern 401 in first AGC sub-field 301.

Index/AGC sub-field 302 is 9 bits in length in this embodiment. Index/AGC sub-field 302 contains three bits of data. Unlike prior art index sub-fields that were used to identify only one sector in each track, according to the principles of this invention, index/AGC sub-field 302 is used to uniquely identify each sector in the track, as explained more completely below.

When the index is lost, index/AGC sub-field 302 is used to reestablish the index as each subsequent index-/AGC sub-field 302 passes under read/write head 202. Therefore, the index is typically established after at most three sectors and usually only two sectors have passed under read/write head 202. If the track has 72 sectors, this means that the index is established on the average within about 1/32 of a revolution of the disk.

Prior art systems required waiting on the average for one-half revolution of the disk until the sector with the index mark passed under the read/write head. Therefore, index/AGC sub-field 302 enhances the capture of the index reference and thereby reduces the rotational latency, i.e., the time spent waiting to re-establish index, over the prior art index sub-field.

Further, index/AGC sub-field 302 provides a uniquely identifiable field for each track sector so that sub-field 302 is used for a servo pattern integrity check during seeks, as explained more completely below. Waveform 502 is an example of the signal generated by magnetic pattern 402 in index/AGC sub-field 302.

Cylinder address/AGC sub-field 303 includes a Gray code full track address. In this embodiment, cylinder address/AGC sub-field is thirty bits in length. The use of Gray code track addresses is fundamentally the same as in the prior art systems. However, as explained more completely below, the Gray code sequence is frequency modulated and this modulation is an important aspect of this invention because the Gray code is used for AGC as well as for determining the track address. Waveform 503 illustrates the possible signals generated by magnetic pattern 403 in cylinder address/AGC sub-field 303.

Sector mark sub-field 304 is 18 bits in length. As the name suggests, sector mark sub-field 304 is used to precisely identify, i.e., mark, the circumferential location of each sector in the track. The first eleven bits in sub-field 304 are a fully DC erased gap. The important aspect of the fully DC erased gap length is that the length is longer than the longest gap in cylinder address/AGC sub-field 303 when the longest gap is bounded on either side by a single bit error.

The fully DC erased gap in sector mark sub-field 304 is used to provide a readily identifiable region for (i) initiation of synchronization and (ii) capturing the track address in the electronic circuitry. Therefore, failure to provide a DC erased gap of sufficient length introduces problems whenever a single bit error occurs in cylinder address/AGC sub-field 303 next to the longest gap in sub-field 303. As illustrated in FIG. 5, the signal generated by this gap is a null signal.

Following the DC erased gap in sector mark sub-field 304 is a first synchronization bit 404A that generates a first synchronization pulse 504A. The first synchronization bit is followed by a second DC erased region of about five bits in length. A second synchronization bit 404B follows the second DC erased region. The length of the second DC erased region is selected to allow sufficient time between the generation of two synchronization pulses 504A and 504B so that the two pulses can be distinguished under the timing variations that may result either from the loss of a clock pulse or the loss of a data pulse in cylinder address sub-field 303.

As explained more completely below, a novel detection method is used so that if first synchronization (sync) pulse 504A is missed, sync timing is obtained from second sync pulse 504B. The ability to obtain sync timing from either pulse in sector mark sub-field 304 enhances the performance of this disk drive over disk drives with prior art embedded servo systems that utilized a single sync pulse.

After sync timing is obtained, only position sub-field 306 is needed to complete the servo operations. Reading of position sub-field 306 requires the most accuracy in AGC. As explained more completely below, the AGC level obtained from sub-fields 302 and 303 should be adequate for precisely reading position sub-field 306. Nevertheless, to assure precision, second AGC sub-field 305 is provided, which is twelve bits long in this embodiment. Waveform 505 is generated by magnetic pattern 405 in second AGC sub-field 305.

Position sub-field 306 is used to precisely center the read/write head on the track. Thus, cylinder address-/AGC sub-field 303 is a course indication of radial position of the read/write head and position sub-field 306 is a fine radial position indicator. In this embodiment, position sub-field 306 includes an equal number of normal and quadrature frame pairs with the frame pairs interleaved. The peak amplitudes in position sub-field 306 are sampled and held by the disk drive electronics in a manner similar to prior art disk drives. The peak amplitudes are electronically averaged to obtain a radial positioning error signal.

Herein, a normal frame refers to a frame that is recorded in half-track positions and a pair of normal frames include one frame with the region above the center line of the track recorded and another frame with the region below the center line of the track recorded. A frame is an arbitrary unit of measure and is simply used to define the various portions of position sub-field 306 which is 39 bits in length. The two frames in a normal pair of frames need not be directly adjacent to each other. For example, a quadrature frame may be interposed between the two frames that constitute the pair of normal frames. To assure that the difference of the readback signals gives position information relative to the track centerline, the normal frames change polarity in adjacent tracks.

A quadrature frame is a frame in which the information is recorded in the on-track position and is either present or missing, in this embodiment. A pair of quadrature frames include one frame with the on-track position magnetized and another frame with the on-track position unmagnetized. The two frames in a quadrature pair of frames are preferably separated by a normal frame. Also, the quadrature frame polarity is opposite in adjacent tracks.

FIG. 4 illustrates a magnetization pattern for one embodiment of position sub-field 306 that consists of an equal number of normal and quadrature servo frame pairs. A first normal frame Na is followed by a first quadrature frame Qa. Quadrature frame Qa is followed by a second normal frame Nb which in turn is followed by a second quadrature frame Qb. The four frames Na, Qa, Nb, Qb form a cell that is repeated two more times to form a three cell position sub-field 306 with a total of twelve frames. The twelve frames include three pairs of normal frames N1, N2, N3, and three pairs of quadrature frames Q1, Q2, Q3. Each frame includes either a pulse pair or no pulses.

The disk drive electronic circuitry inverts the negative pulses in the normal frames Na and Nb and adds them together. The electronic circuitry samples the height of the resulting positive peak from the normal frames and the height of the positive peak from the quadrature frames. The average of the three peaks from the three cells is used to generate the position error signal in a matter well known to those skilled in the art.

An important aspect of this invention is that the position data in position sub-field 306 contains frequencies common to the sub-fields used to obtain the AGC level. Specifically, pulse pairs are written with period T1 and are spaced apart from each other by at least period T2. The frequency content of position sub-field 306 closely matches that of the AGC sub-fields and provides increased margin for the separation and proper detection of Quadrature and Normal position pulse information. If position pulses are separated by at least period T2, the effects of intersymbol interference are minimized.

Signal 609 (FIG. 6) is timed from the sync pulse of the current sector and is used to capture each Quadrature and Normal position pulse. The window, i.e., the low portion of signal 609, has a width of time T2 and the time between windows is time T1. Position sub-field 306 provides highly accurate track following information.

Position sub-field 306 is only illustrative of one embodiment of a position sub-field suitable for use in the servo field of this invention and is not intended to limit the invention to the particular embodiment described. Other position sub-fields suitable for use in this invention are described in the copending and commonly assigned U.S. patent application Ser. No. 07/630,475 entitled "Servo Field Scheme for High Sampling Rate and Reduced Overhead Embedded Servo Systems in Disk Drives," of John H. Blagaila et al. filed on Dec. 19, 1990, which is incorporated herein by reference.

A summary of the length for servo field 300 of this invention is given in Table 1. For comparison, the length of servo field 100 is also estimated. The unit of measure chosen for comparison is a bit as defined above, i.e., the period of time from a peak of one polarity to a peak of a second polarity.

TABLE

| Prior Art Servo Field 100 Sub-field | Length | Servo Field 300 Sub-field | Length |
|---|---|---|---|
| Write-to-Read | ~27 | Write-to-Read | 37 |
| AGC | ~36 | | |
| Sector Mark | ~21 | AGC I | 4 |
| Index 1 | ~2 | Index/AGC | 9 |
| Defect | ~2 | Cylinder Address/AGC | 30 |
| Cylinder Address | ~25 | Sector Mark | 18 |
| Index 2 | ~2 | AGC II | 12 |
| Position | ~28 | Position | 39 |
| TOTAL | ~143 | TOTAL | 149 |
| % AGC (36/143) | 25 | % AGC (w write/read) | 62 |
| | | (w/o write/read) | 37 |

The ratio of the length of AGC data to the total servo field length is significantly greater according to the principles of this invention even though the total servo field length is substantially the same as the prior art servo field. As explained above, the enhancement in the amount of AGC data is achieved by using several sub-fields for two servo functions concurrently.

In this embodiment, the frequencies of the information in the servo sub-fields used for AGC and another function concurrently are preferably selected from within a bandwidth of frequencies that are common, or as near to common as possible to every data region on the disk. For example in one embodiment, the slowest data frequencies correspond to periods in the range of 144 nanoseconds to 576 nanoseconds while the fastest data frequencies correspond to periods in the range of 92 nanoseconds to 384 nanoseconds. Thus, the two zones have a common range of 144 to 384 nanoseconds. For this range, first time period T1 was selected as 208 nanoseconds and second time period T2 was selected as 416 nanoseconds. This range of periods trades better resolution for slightly poorer AGC control. Further, period T1 is common to the periods in both data zones.

As indicated above, index/AGC sub-field 302 and cylinder address/AGC sub-field 303 are used as AGC data for position sub-field 306. Use of cylinder address/AGC sub-field 303 as both an AGC sub-field and a cylinder address sub-field concurrently requires that the gain transition from data region 310 to cylinder address/AGC sub-field 303 is small so that only a small AGC adjustment is at most necessary for reading the cylinder address. Accordingly, the frequencies for the Gray code in cylinder address/AGC sub-field 303 have been chosen so that the frequencies are very similar to the frequencies of data region 310, i.e., periods T1 and T2 are used in cylinder address/AGC sub-field 307. Similarly, index/AGC sub-field 302 is also written using these periods so that the three data bits can be read and stored even though sub-field 302 occurs almost immediately at the start of servo field 300.

Also as explained above, clock pulses have a first polarity, e.g., negative, and data pulses have a second polarity that is different from the first polarity, e.g., positive. To read and save the index and cylinder address, the signal from read/write head 202 is first demodulated.

Since the data is written in a frequency modulation format, as described above, any common frequency demodulation circuit may be used. In addition, the data on disk 201 and consequently the data provided to or from read/write head 202 is serial data. However, the data is preferably supplied to disk drive microcontroller 210 as parallel data. Consequently, the serial data signal from read/write head 201 for servo field 300 is deserialized with a shift register that contains two more bits than the number of data bits in cylinder address/AGC sub-field 303 and the index/AGC sub-field 302.

The shift register is enabled prior to the start of index sub-field 302. The precise time that the shift register is enabled is not important so long as the shift register is enabled early enough to allow for any timing variations so that no data bits of the index and cylinder data are lost. In this embodiment, the signals from read/write head 201 are applied to the shift register at about 6,667 nanoseconds after the start of write-to-read recovery area 312. (See FIG. 7B).

The serial data signal from read/write head 201 is first demodulated by the frequency demodulator circuit. The output signal from the frequency demodulator circuit is the input signal to the shift register.

Since index sub-field 302 and cylinder address sub-field 303 are both written with frequency modulation that begins with a negative pulse and is followed by a positive data pulse, i.e., a pulse pair, the negative pulse is used as a clock bit so that servo pattern 300 in these sub-fields is self-synchronizing. Thus, the negative pulses (clock pulses) are used to initiate a clock signal that clocks the index and cylinder data through the shift register. This clock signal is resynchronized after every clock pulse generated by servo field 300. The period of the clock signal is period T1 plus period T2.

Each data bit is clocked into the shift register and then serially shifted through the shift register. When a data bit reaches the end of the shift register, the data bit is shifted out of the register. Consequently, when DC erased gap is reached, the shift register contains the track address and index.

Since index/AGC sub-field 302 and cylinder address/AGC sub-field 303 are self-sychronizing, a data bit would normally be lost if either a clock bit or a data bit is dropped when reading these sub-fields. In this embodiment, when a data bit is missed, the subsequent clock bit is also lost. However, the shift register clock signal is allowed to run for one cycle without receiving a clock pulse from servo field 300. Specifically, the previous clock pulse from servo field 300 is used as a reference. However, if a second consecutive clock pulse from servo field 300 is missed, the shift register clock signal is shut down.

The free running clock signal provides some timing robustness because the missed data bit had a fifty percent probability of being a zero. Thus, clocking a zero through the shift register in response to a missing data bit or clock bit in servo field 300 results in eliminating an error fifty percent of the time on the average.

When the DC erased gap begins, the shift register clock signal continues for two extra cycles and then stops. The shift register contains two extra bits so that the last bits clocked in by the two extra clock cycles are ignored. The other bits in the shift register contain the index and track address. After the DC erased gap is detected, the data is held in the shift register and the clock signal is disabled. The index and gray code read circuitry is turned off and the thirteen bits for the index and track address read from servo field 300 are stored.

The three index bits represent a number between 0 and 7. The sequence of index numbers in the sectors is used as a course indicator of the circumferential position of the read/write head. In this embodiment, the sequence of index numbers are the same for each track on the disk and are stored in firmware that is used by the disk drive microprocessor. In one embodiment, the sequence is given in Table 2.

TABLE 2

| Sector | Index | Sector | Index | Sector | Index | Sector | Index |
|--------|-------|--------|-------|--------|-------|--------|-------|
| 0 | 0 | 18 | 2 | 36 | 2 | 54 | 4 |
| 1 | 1 | 19 | 1 | 37 | 2 | 55 | 4 |
| 2 | 0 | 20 | 3 | 38 | 5 | 56 | 5 |
| 3 | 2 | 21 | 1 | 39 | 2 | 57 | 4 |
| 4 | 2 | 22 | 4 | 40 | 2 | 8 | 4 |
| 5 | 0 | 23 | 4 | 41 | 6 | 59 | 6 |
| 6 | 3 | 24 | 1 | 42 | 2 | 60 | 4 |
| 7 | 0 | 25 | 5 | 43 | 2 | 61 | 4 |
| 8 | 4 | 26 | 1 | 44 | 7 | 62 | 7 |
| 9 | 4 | 27 | 6 | 45 | 3 | 63 | 5 |
| 10 | 0 | 28 | 1 | 46 | 4 | 64 | 6 |

TABLE 2-continued

| Sector | Index | Sector | Index | Sector | Index | Sector | Index |
|--------|-------|--------|-------|--------|-------|--------|-------|
| 11 | 5 | 29 | 7 | 47 | 4 | 65 | 6 |
| 12 | 0 | 30 | 2 | 48 | 3 | 66 | 5 |
| 13 | 6 | 31 | 2 | 49 | 5 | 67 | 7 |
| 14 | 0 | 32 | 3 | 50 | 3 | 68 | 7 |
| 15 | 7 | 33 | 2 | 51 | 6 | 69 | 6 |
| 16 | 1 | 34 | 2 | 52 | 3 | 70 | 6 |
| 17 | 2 | 35 | 4 | 53 | 7 | 71 | 7 |

After an index is stored in the shift register, the microprocessor saves the index. After the microprocessor saves the index for the adjacent sector, the microprocessor can determine the circumferential position 76% of the time from the two index numbers. Specifically, the microprocessor compares the two index numbers with the data in Table 2 to ascertain the sector number. However, if the two stored index numbers are the same, a third index number is required to identify the coarse circumferential position of the read/write head. Thus, on the average 2.24 sector reads are required to determine sector location. Hence, establishing index does not require waiting for one predetermined sector to pass under the read/write head as in the prior art but rather, index is always established within three sector reads.

In addition, index data provides an integrity check on the servo pattern during seeks in addition to those described more completely below. Herein, an "integrity check" means a check to establish that the servo pattern is read correctly. If for some reason the servo timing is lost or perhaps a data bit is dropped, the servo pattern may be read incorrectly.

For example, during a seek read/write head 201 may jump a variable number of tracks between servo sectors. Thus, the microprocessor only knows that the cylinder address should be within some range of tracks, but this is not sufficient for an accurate servo pattern integrity check. In contrast, the index of this invention provides an integrity check after reading at most three servo sectors.

Specifically, the microprocessor reads the index for two servo sectors and uses Table 2 to project the index for the next servo sector if the two sector index values are different. If the two sector index values are the same, a third index value is read and Table 2 is then used to project the index for the next servo sector. The microprocessor compares the projected index with the next index read. If the next index read and the projected index are the same, the first integrity check of the servo field pattern has been verified. Using this process during seeks, enhances the seek performance of the disk drive by providing a warning of a potentially bad servo pattern. Thus, the index from index/AGC sub-field 302 serves a dual function, i.e., coarse circumferential positioning and servo field integrity check. The use of sub-field 302 for these two functions plus the AGC function provides a significant amount of data without increasing the servo overhead.

In prior art systems, a dedicated set of bits were sometimes used as an integrity check but these bits provided neither any information about individual sectors nor AGC level. The dedicated set of integrity bits was often times the only qualifier of a good servo field. Consequently, a single bit error in the prior art dedicated set of integrity bits caused an increase in servo field sync loss or error rate.

According to the principles of this invention, the integrity check of index/AGC sub-field 302 is only one of several integrity checks. Thus, if the index integrity check is bad, the additional servo zone integrity checks, described below, determine whether the servo information should be used or only a part of it should be used.

Another important point is that the loss of any one integrity check does not result in the loss of sync, whether it be the sector address (index), or cylinder address, sync1 missing, or sector window misalignment, that are described more completely below. A single bad integrity check only generates a warning that the servo pattern is not pristine and should be treated accordingly.

For example, the write operation is the most dangerous mode of operation in the instance of an erroneous servo sector. Thus, in performing writes if any one of servo integrity checks fails, typically, the write operation should stop immediately and report an error so that a reread of the servo field and a rewrite may be attempted. Conversely, in idle mode, if any one of the integrity checks fail, no additional action is typically taken except perhaps some additional monitoring to see if the error repeats excessively in which case the sector may be flagged as a bad sector.

Since the index/AGC and cylinder address AGC sub-fields 302, 303 are self-clocking and therefore do not require a synchronization (sync) pulse for timing, these sub-fields may be positioned before sector mark sub-field 304. As described above, sub-fields 302, 303 function as index and cylinder address sub-fields as well as an AGC sub-field. However, additional AGC margin is provided by supplying first AGC sub-field 301.

First AGC sub-field 301 along with index mark sub-field 302 and cylinder address sub-field 303 is sufficient AGC data for accurate reading of both sector mark sub-field 304 and position sub-field 306. Note, as explained above, second AGC sub-field 305 is provided, in one embodiment, to provide additional AGC margin for position sub-field 306.

The index bits are only needed (i) in the early stages of the disk drive initialization, (ii) for servo field integrity checks during seeks, or (iii) when the index is lost, i.e., the index bits are required only when the index is being established or verified. In each of these cases, the disk drive is not in a write mode, and so write-to-read recovery field 312 at the end of the data region 310 is not needed for write-to-read recovery and thus can be used for AGC data for reading the index bits. In write mode, sectors are counted to keep track of sector number and cylinder addresses are read so as to insure that data is written in the proper location.

Consequently, additional AGC data for index sub-field 302 is provided in write-to-read recovery field 312. To protect the bits residing in write-to-read recovery field 312, a servo field write protect signal 601 goes active at about one microsecond after the start of the write-to-read recovery region and remains high until the next data region begins.

In FIG. 6, servo field write protect signal 601, write mode AGC hold signal 602, AGC hold except for write mode signal 603, sync1 sector reference window 606 and sync2 sector reference window 608 are timed, typically using counters, from the synchronization pulse generated by sector mark sub-field 304 in the previous servo sector field 300. AGC hold signals, after sync is established in the current sector, are timed from the current sector. Of course, this applies only to AGC sub-field 305, which is not used if sync is not established, i.e., the sector is not found. Specifically, windows 602A and 603A are timed for sync in the current sector so as to capture the AGC data in AGC sub-field 305.

The time length of each of the servo sub-fields, the data region, and the write-to-read recovery region are known. Accordingly, the delay time after the previous sector synchronization pulse until a particular signal changes state is easily determined by simply counting the time that has passed since the previous sector synchronization pulse.

Since the integrity of the write-to-read recovery field 312 is protected by servo zone write protect signal 601, this field is available for AGC whenever the disk drive is not in write mode. There are at least three instances when the AGC data in write-to-read recovery field 312 is used. These include (i) when the index bits are read to establish the index; (ii) in pulse power mode, i.e., disabling the read channel over the data regions, where the AGC value is lost between servo fields; and (iii) in a seek, where there are no data under the read/write head.

Another important aspect of servo field 300 of this invention is that data are ordered from the least correct AGC level needed to the most correct AGC level needed to assure accurate reading of the servo data. Consequently, the servo pattern starts with bits that do not contain data, followed by index bits, which are read with the use of the write-to-read recovery field for AGC, the Gray code in cylinder address sub-field 303, sector mark sub-field 304, and position sub-field 306. This ordering of sub-fields assures that each sub-field is read with the necessary AGC level to assure reliable operation.

Signals 602 and 603 (FIG. 6) indicate the AGC hold signal for the write mode and all other modes, respectively. While the AGC hold signal is active, e.g. high, the current AGC level is held. When the AGC hold signal is inactive, e.g., low, the data being read is used to adjust the AGC level. Signals 602 and 603 show that sub-fields 302, 303 and 305 are used for AGC data as well as write-to-read recovery area 312 except in write mode. Time zero in FIG. 6 is about 188 microseconds after the first sync pulse in the previous servo field. The adjustment of AGC level based upon AGC data is known to those skilled in the art.

After obtaining a good AGC level from write-to-read recovery region 312 in all cases except following a write and from sub-fields 301 to 303, the disk drive read channel is prepared to detect the first synchronization (sync1) pulse 504A and second synchronization (sync2) pulse 504B generated by sector mark sub-field 304.

If one of sync1 pulse 504A and sync pulse 504B is miscaptured, servo information following sector mark sub-field 304 is either lost or corrupt. It is important therefore to have immunity to errors in detecting the sync pulse and a method of detecting an incorrect sync pulse. Servo field 300 of this invention has immunity to erroneous sync pulse generation or capture as well as a means for detecting an incorrect sync pulse.

With respect to error immunity, there are two types of servo field read errors, missing bits and extra bits. Immunity to a single bit error is an important aspect of this invention. If the sync pattern in sector mark sub-field 304 is susceptible to single bit errors, the sync pattern can be expected to be lost at the error rate inherent to the technology used. In disk drives, this error rate is typically 1 in $10^{10}$.

If it is possible to design a sync pattern, i.e., a sector mark sub-field, that is only susceptible to errors of two or more bits then the immunity to errors increases dramatically. In disk drives, the error rate for two independent errors is the square of the single bit error rate. Using 1 in $10^{10}$ for the error rate of a single bit, a sync pattern that requires two independent bit errors results in an error rate of 1 in $10^{20}$ (since the errors are independent events their probabilities multiply). Thus, if the sync pattern is immune to two independent bit errors, errors occur 10 billion times less frequently.

To obtain sync to the disk, an area prior to the actual sync bit location must be identified so that the hardware that triggers on the sync pulse can be set up. The area that is identified is the DC erased gap in sector mark sub-field 304. Specifically, the distance between pulses in servo field 300 is monitored and when no pulses are detected for a predetermined period of time, typically about two microseconds in this embodiment, hardware is enabled to detect the sync pulse.

Consequently, the DC erased gap must be neither falsely identified by the occurrence of a missing bit in cylinder address sub-field 303, nor missed due to an extra pulse in the DC erased gap in sector mark sub-field 304. To permit larger spin speed variations without losing the sync timing, i.e., miscapturing the sync bit, the hardware that detects the DC gap is energized early in cylinder address/AGC sub-field 303.

Specifically, DC gap search window signal 604 goes active at about 13 microseconds after the start of write-to-read recovery region 312. (See also FIG. 7D). DC gap search window 604 remains active until about 19 microseconds to account for spin speed variations. The DC erased gap length must be chosen to be longer than any naturally occurring DC erased gap bounded by a single missing bit error, as described more completely below.

Since DC erased gap detection is started in cylinder address/AGC sub-field 303, it is important that the qualification length for the DC erased gap is longer than any normally occurring DC erased gap within the Gray code track address. In addition for missing bit immunity, the DC erased gap must be longer than the longest normally occurring DC erased gap that can be produced in the Gray code by the occurrence of one missing bit, i.e., longer than the longest normally occurring DC erased gap that can be produced by the occurrence of one missing bit in the servo sub-field immediately preceding the DC erased gap. Consequently, the DC erased gap is in the range of 3*TDC to 36*TDC and is preferably about 10*TDC where time TDC is 166.667 nanoseconds in this embodiment and is the length of the clock cycle used to increment the DC gap counter. Notice that period TDC is eight-tenths of period T1.

After the Gray code address is read, the DC erased gap must not be corrupted by an extra pulse that effectively hides the DC erased gap. The DC erased gap begins with the last negative pulse of the Gray code address and ends a predetermined time following the absence of negative pulses. Positive pulses are ignored.

The read channel only permits positive pulses to follow negative pulses and so if an error occurs, the read channel permits only a positive error pulse to propagate through after the last negative pulse of the cylinder address field. Since positive pulses are not detected when measuring the DC gap, a positive error pulse has no effect. Thus, the DC gap is immune to single bit errors that generate a positive pulse following the last negative pulse in cylinder sub-field 303.

After the DC erased gap is detected, one of two sync pulses 504A and 504B must be accurately detected. As explained above, the sync pulse identifies the precise circumferential location of the sector on the track. If a spurious pulse is qualified as the sync pulse, subsequent servo, read, and writing timing signals are likely to be erroneous. Consequently, a part of the servo field may be overwritten by a write operation and this would ruin the disk drive until the disk embedded servo pattern was reconstructed at the factory.

Thus, according to the principles of this invention, a novel method that compensates for (i) a single bit error in the magnetization pattern, (ii) spin motor speed variations and (iii) normal sampling variations is used to qualify the synchronization pulse. Briefly, first synchronization pulse 504A must be located within a first window 605A referenced to the start of the DC erased gap, referred to as the sync1 DC reference window, and a first window 606A referenced to the synchronization pulse for the immediately preceding sector, referred to as the sync1 sector reference window.

If first sync pulse 504A is coincident with both windows 605A, 606A, first sync pulse 504A is qualified and used. If the first synchronization pulse 504A is coincident with window 605A, but not with window 606A the first sync pulse 504A is still qualified and used. However, an error is reported which implies a error in spin speed or a possible erroneous sync1 pulse.

If first sync pulse 504A does not align with either window 605A, 606A, it is ignored and synchronization may still be established with second synchronization pulse 504B using substantially the same criteria for windows 607A and 608A that was described above for sync1 pulse 504A with regard to windows 605A and 606A.

Synchronization may be achieved with either first or second synchronization pulses 504A, 504B. If first sync pulse 504A is qualified, second sync pulse 504B is ignored. To further explain the novel synchronization method, the criteria for locating the various windows, the width of the windows, and the elimination of spurious or missing pulses is described more completely below using FIGS. 7A to 7H. Herein, a reference to a window being open refers to the width of the window.

In FIGS. 7A to 7H, similar features have the same base reference numeral followed by a letter corresponding to the letter designating the figure. Rows 752A to 752H are one continuous radial magnetization pattern for a representative servo field 300 of this invention. Servo field magnetization pattern 752A to 752H is broken into several pieces for ease of presentation only. Rows 751A to 751H represent a period of time equal to 333.3333 nanoseconds (8*41.66667) nanoseconds. Thus, the end of period 24 in row 751B corresponds to about 8000 nanoseconds. Rows 755E to 758E and 755F to 758F represent clock interval TDC used to increment the DC gap counter. In this embodiment, each clock interval TDC is one-half the time period in row 751. The reference numerals in the six hundreds in FIGS. 7A to 7H represent the time of the corresponding edge or feature in FIG. 6.

The use of a particular time in the Figures is illustrative only of one embodiment of the invention. The important aspect is not the actual time values, but as explained more completely below, the relative relationship of the various regions in the servo field and timing of the signals used to capture the information in the servo field.

Leading edge 605A-L of sync1 DC reference window 605A is selected assuming that the last bit in the Gray code cylinder address is properly read. As illustrated in FIG. 7E, the DC gap counter is reset by the negative pulse with a peak at the end of time period 49 in row 751E. The DC gap counter is incremented by each of the clock ticks corresponding to the periods in row 755E. When the DC gap counter reaches the count "11", as explained above, the DC erased gap is qualified and so hardware to generate sync1 DC reference window 605A is enabled. On the next clock edge, i.e., the start of period 12 in row 755E, leading edge 605A-L is triggered. Hence, sync1 DC reference window 605A starts immediately, i.e., opens, after the DC erased gap is qualified.

The width of sync1 DC reference window 605A is selected to assure proper reading of the position data in position sub-field 306 if sync1 pulse 504A falls within window 605A, i.e, sync1 pulse 504A occurs while window 605A is open. As explained above, each pulse pair in position sub-field 306 has a period of T1 and pulse pairs are spaced apart from each other by a period of T2, where periods T1 and T2 were defined above and period T2 is twice period T1. Hence, in this embodiment, if sync1 pulse 504A falls within a window that is about 3*T1 in width, the position pulses in sub-field 306 are still correctly detected. Since period T1 is 208 nanoseconds, sync1 DC reference window 605A is preferably less than 624 nanoseconds in width. Thus, the width of sync1 DC reference window 605A was selected as 500 nanoseconds, i.e., three DC gap counter clock periods TDC wide, as shown in row 755E.

In addition to assuring proper detection of the position data, this width window also compensates for normal variations in sampling the start of the DC erased gap. There may be up to one clock pulse delay in sampling the start of the DC erased gap in which case the DC gap counter would be incremented as shown in row 756E. In this case, sync1 DC reference window 605A would start one DC gap clock cycle later, but window 605A is still three clock periods TDC wide. Hence, as shown in FIG. 7E, first sync mark 404A falls within the window that is enclosed in box 605A.

Thus, the first requirement for qualification of first sync pulse 504A is that the pulse occur with a first predetermined time after a selected reference point in the servo field, i.e., the start of the DC erased gap. However, another qualification is also used to assure that proper timing is achieved.

The second qualification is derived from the previous synchronization pulse. As indicated above, the distance between synchronization pulses is a precise circumferential distance so that the time period between sync pulses is known. Thus, a counter could simply be started and when the counter reached the time interval between synchronization pulses, circuitry is enabled to capture the next sync pulse. However, this assumes that the spin speed of the disk is an unvarying constant. In fact, the spin speed varies about the specified speed "S" by an amount $\pm V$. Thus, to allow for spin speed variation, a window with a width W2 is selected where width W2 is given by:

$$W2 = (120/S) * (1/(\text{No. of sectors/track})) * (V/100)$$

where

S is the spin motor speed in revolutions per minute

V is allowed variation in spin motor speed expressed in percent.

In this embodiment, speed S is 3571 rpm. The number of sectors per track is seventy-two and speed variation V is ±0.2%. For these values, window width W2 is calculated as 0.93 microseconds. Hence, the width of window 606A and 608A was selected as one microsecond which is substantially equal to width W2. Window width W2 is centered about the point where the synchronization pulse would be located if the spin motor speed was in fact a constant, i.e., about 233 microseconds after the previous synchronization pulse.

As illustrated in FIG. 7F, the negative sync1 pulse starts at synchronization mark 404A which is 56.25 time periods (row 751F) after the start of write-to-read recovery region 312 Therefore, first sync1 sector reference window is centered about this point and so starts at 55.75 time periods and ends 58.75 time periods after the start of write-to-read recovery region 312, where the time period is 333.33 nanoseconds.

First sync1 pulse 504A is not accepted unless it falls within sync1 DC gap reference window 605A. An error is reported if it does not also fall within sync1 sector reference window 606A. For example, if an error causes the DC erased gap to be prematurely detected, sync1 pulse 504A would still be within sync1 sector reference window 606A, but not within sync1 DC gap reference window 605A which would have occurred at a much earlier time. Consequently, sync is not established in this case by sync1 pulse 504A.

Even when sync is not established on sync1 pulse 504A, sync may still be established with sync2 pulse 504B. As explained above, to obtain sync from sync2 pulse 504B, pulse 504B must be coincident with sync2 DC gap reference window 607A. The location and width of sync2 sector reference window 608A are chosen in the same manner as described above for sync1 sector reference window except the window is centered about second sync mark 404B which is about 233 microseconds after the second sync mark in the previous sector.

The leading edge and width of sync2 DC gap reference window 607A are selected by considering the reasons why first sync pulse 504A may be missed. If the last bit in the Gray code cylinder address is dropped or missing, the DC gap counter is started as shown in row 757E, or in row 758E with a sampling error. Consequently, sync1 DC gap reference window 605A occurs to early. To capture sync2 pulse 504B, the tolerances on sync2 DC gap reference window 607A are greatly relaxed.

In this embodiment, window 607A is started so that when the last Gray code bit is lost, window 607A overlaps with the sync1 DC gap reference window 605A when a sampling error occurs in determining the start of the DC erased gap as illustrated in rows 756F and 757F. Thus, as illustrated in FIG. 7F, the leading edge of the window is at 18.5*TDC which in this embodiment is about 3,083 nanoseconds after the start of the DC erased gap. In one embodiment, the DC gap counter is used to generate a signal at 18*TDC that in turn generates window 607A.

The width of window 607A is selected so that sync2 DC gap reference window 607A extends at least one clock period TDC after the peak of sync2 pulse 504B when the last bit in the Gray code cylinder address is lost. Thus, as shown in FIG. 7F, the window extends from 18.5*TDC seconds to 25.5*TDC after the start of the DC erased gap when the last bit in the Gray code cylinder address is dropped or missing as shown in row 757E. Thus, sync2 DC gap reference window 607A is 7*TDC seconds wide, e.g., about 1,167 nanoseconds.

Row 755F illustrates the location of sync2 DC gap reference window 607A when the start of the DC erased gap is detected normally. Row 756F illustrates the location of sync2 DC gap reference window 607A when the start of the DC erased gap is detected following a sampling error and row 758F illustrates the location of sync2 DC gap reference window when the start of the DC erased gap is detected following a sampling error and when the last bit in the Gray code cylinder address is dropped or missing. In each of these cases, sync2 pulse 504B falls within sync2 DC gap reference window 607A.

When sync2 pulse 504B falls within sync2 sector reference window 608A and sync2 DC gap reference window 607, sync is established. However, since a error must occur to not sync on sync1 pulse 504A, an error is flagged and the write mode of operation is inhibited in one embodiment. If sync is obtained on sync1 pulse 504A in the next sector, operation continues normally. However, after a predetermined number of consecutive syncs on sync2 pulse 504B, typically three or four, a problem clearly exists and the disk drive must be resynchronized.

In prior art systems, if sync was lost on the sync1 pulse, resynchronization was necessary. However, the use of the novel method described above maintains sync even when sync on sync1 pulse 504A is lost. Consequently, this method enhances operation of the disk drive over prior art systems. Specifically, FIGS. 8A to 8C illustrate in more detail the robustness of sync operation using the method of this invention.

Figure 8A:
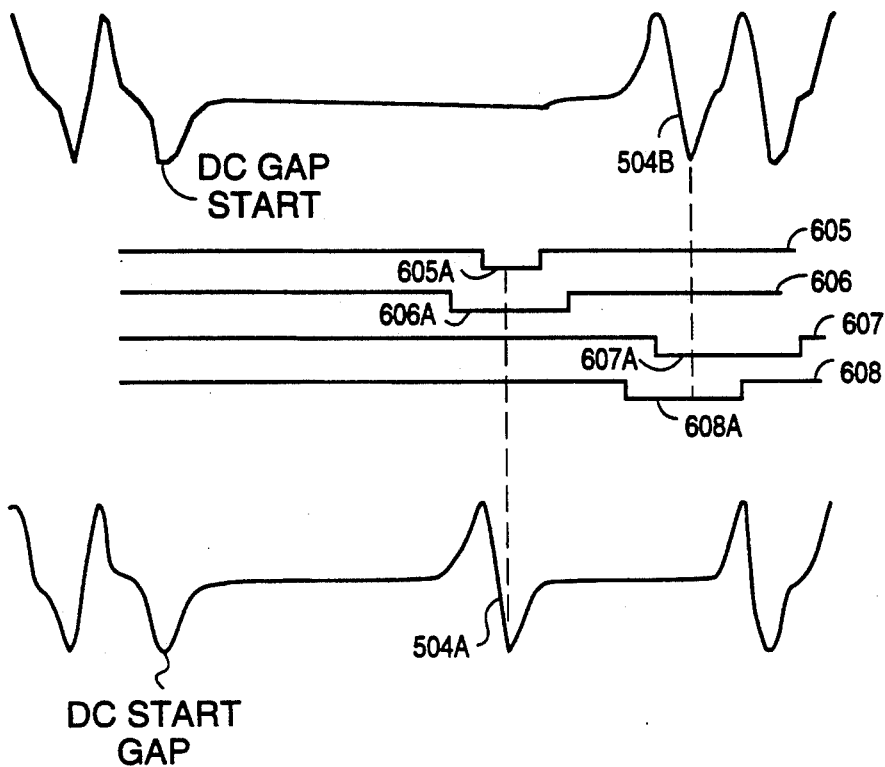
FIG. 8A to 8C illustrate the error immunity obtained in synchronization using the principles of this invention.

In FIG. 8A, sync1 pulse 504A is missing. However, sync2 pulse 504B is coincident with sycn2 DC gap reference window 607A and sync2 sector reference window 608A. Thus, sync is obtained with sync2 pulse 504B. When sync is obtained from sync2 pulse 504B, processing is transferred to a point in hardware so as to compensate for the time difference between sync1 pulse 504A and sync2 pulse 504B.

Figure 8B:
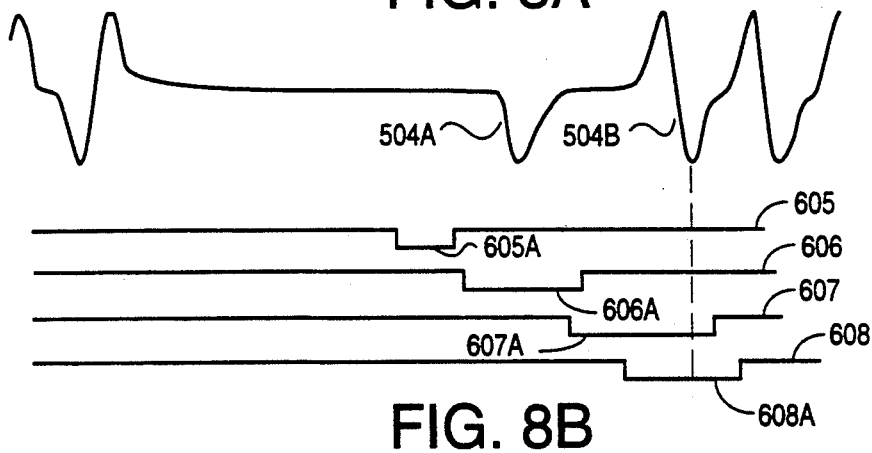

In FIG. 8B, the last bit in the Gray code cylinder address is missing and so the DC erased gap is qualified prematurely. Consequently, sync1 DC gap reference window 605A occurs early and coincidence is not obtained between sync1 pulse 504A and the two windows 605A and 606A. However, sync is maintained by capture of sync2 pulse 504B.

Figure 8C:
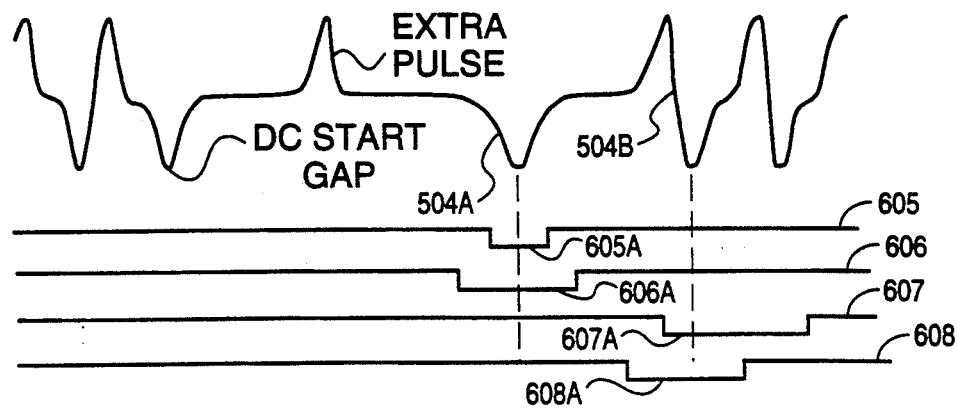

FIG. 8C illustrates an extraneous positive pulse which has no affect on the windows. Consequently, sync is obtained from sync1 pulse 504A.

Another qualification of the sync timing is a measure of the accuracy with which the index and cylinder addresses are read sector to sector. If the index or gray code data bits are determined incorrect, the sync is suspect and appropriate action taken, e.g., a flag is set to indicate that if errors persist in subsequent sectors reading the index and gray code data bits, corrective action is required.

The use of the two windows in synchronization provides an easy means to provide further power reduction for a disk drive and maintain synchronization. Specifically, either the counter used for the sync DC gap reference window or the counter used for the sync sector reference window may be programmed to count for two sectors rather than one so that sync is established only for every other sector. This would permit the read channel to remain inactive over the servo field for the skipped over sector and thereby reduce power consumption. The extension to skipping 2, 3, 4, or even an arbitrary number of sectors follows the same principle and requires only an appropriate adjustment of the counters used. Hence, only a subset of the servo fields in a track are read thereby reducing power consumption when the disk drive is idle.

The electronic circuitry used to drive actuator 204 based upon the embedded servo field of this invention is similar to the circuitry used in prior art systems. In view of the above description of the embedded servo field of this invention, the other electronic circuitry required to convert the prerecorded information in the servo fields into electronic signals to drive the actuator will be apparent to those skilled in the art. Hence, the electronic circuitry (FIG. 2) used with the embedded servo system is only briefly described.

The electronic circuitry includes a read/write preamplifier 205 that receives the signals from read/write head 202. One preamplifier suitable for use with the embedded servo system is available from Silicon Systems, Inc. of Tustin, Calif. as part no. 32R2030. The output signals from preamplifier 205 drives read/write combo circuit 206 which is illustrated in more detail in FIG. 9A and 9B. In one embodiment, the read/write combo circuit is an integrated circuit available from National Semiconductor, Inc. of Santa Clara, Calif. as part number DP8491.

Figure 9A:
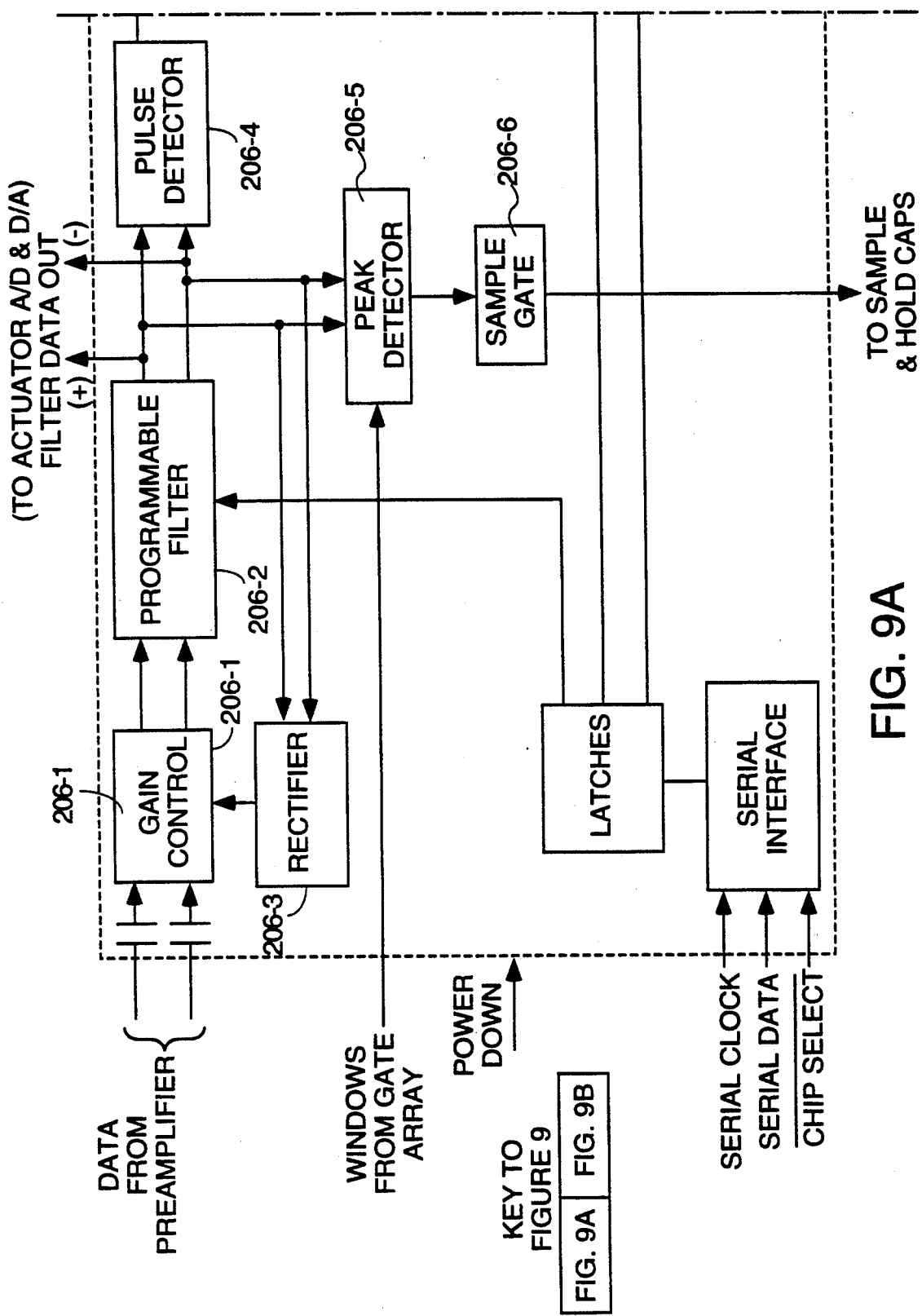
FIGS. 9A and 9B are a block diagram of one embodiment of a read/write combo circuit suitable for use in a disk drive having the novel interleaved embedded servo system of this invention.
Figure 9B:
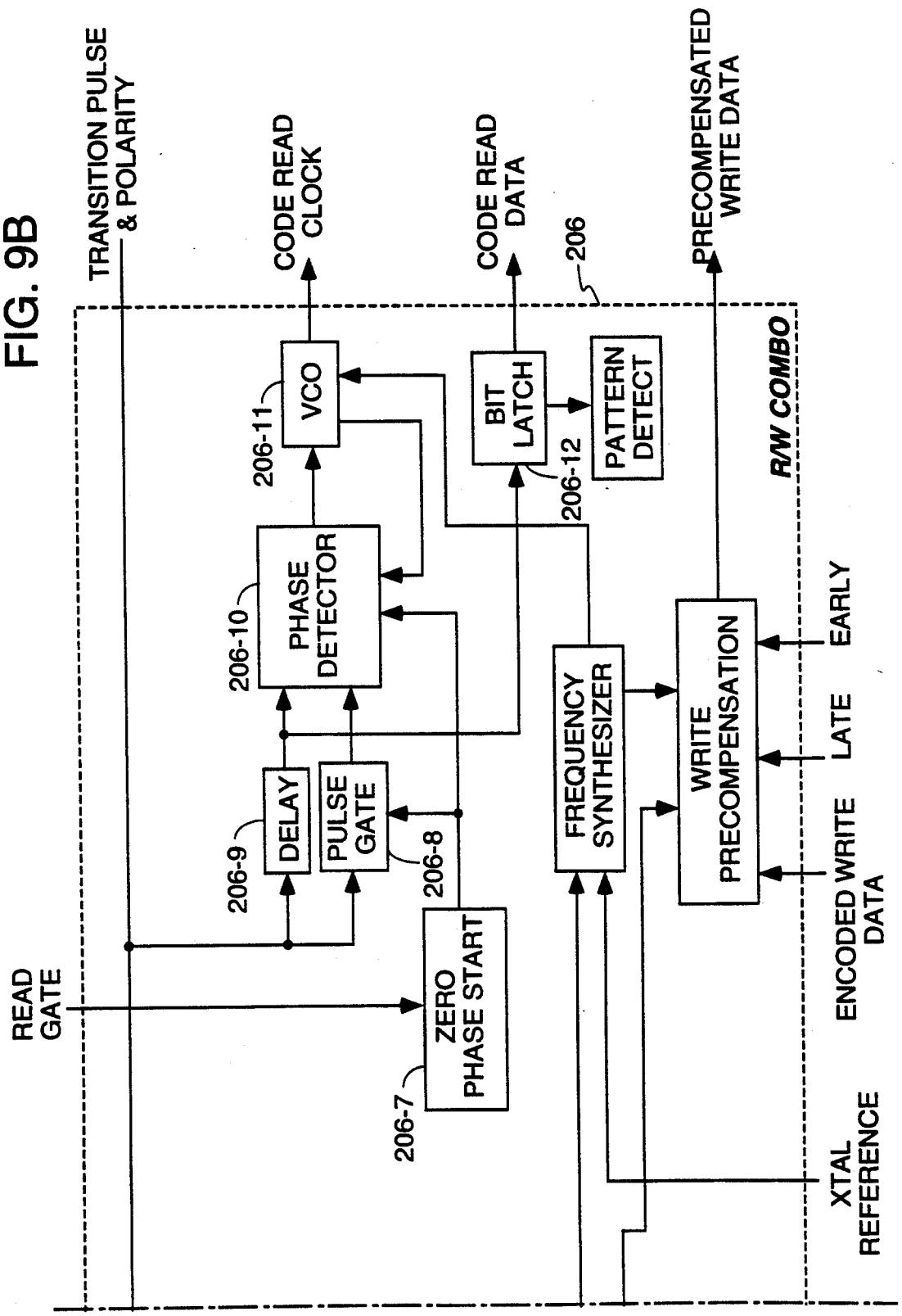
Figure 10C:
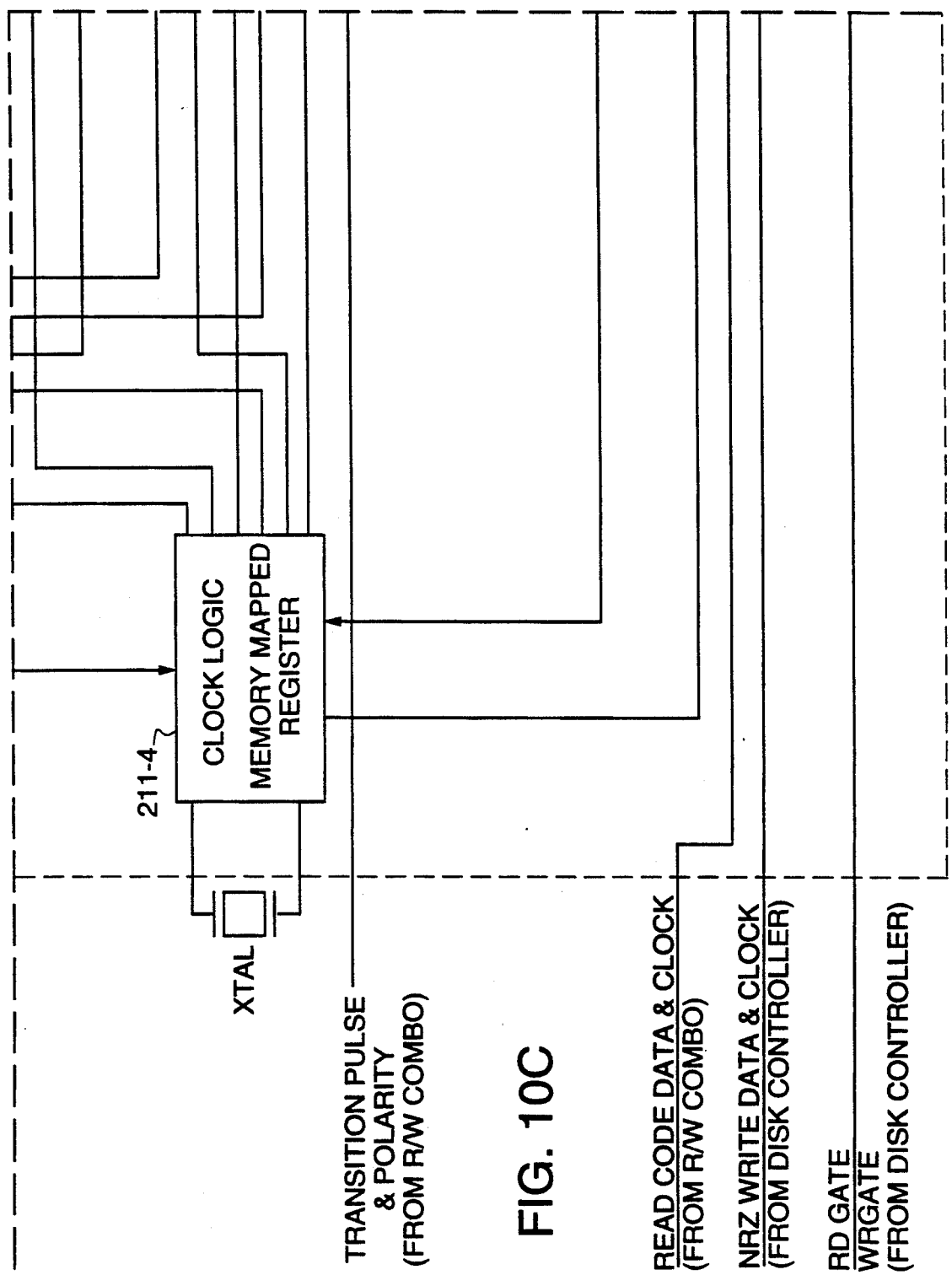
Figure 10D:
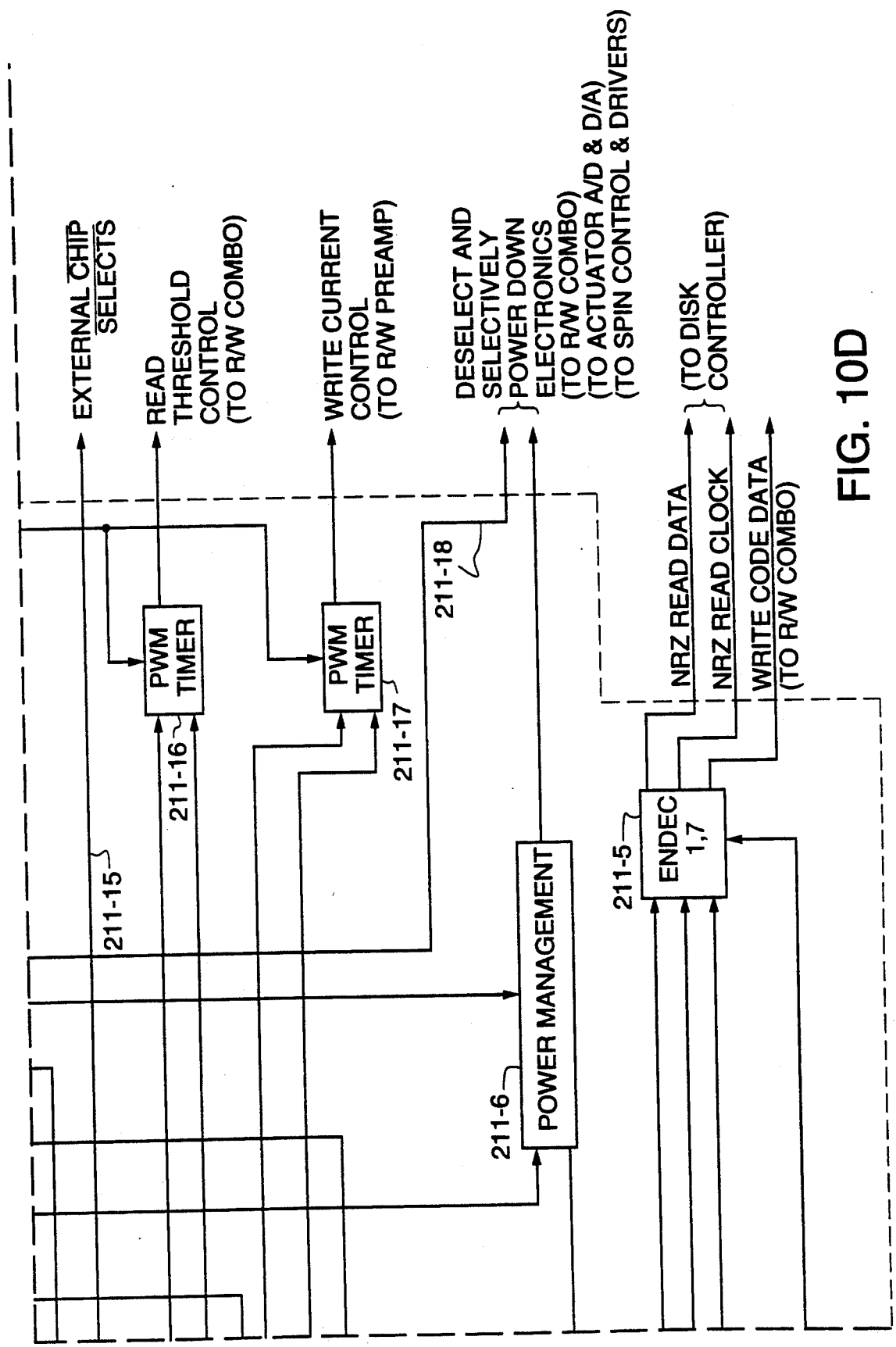

Read/write combo circuit 206, in response to analog data from read/write preamp 205, provides automatic gain adjusted signals through programmable filter 206-2 to an internal pulse detector 206-4 (FIG. 9A). The signals into pulse detector 206-4 generate a transition pulse and polarity signal for gate array 211 (FIGS. 10A to 10D) which in turn generates a signal used to determine the window for Gray address separator 211-14 (FIG. 10B).

Read/write combo circuit 206 also includes a delay circuit 206-9 (FIG. 9B) and a pulse gate circuit 206-8 that each generate a signal in response to the signal from pulse detector 206-4 (FIG. 9A). In response to a read gate signal, zero phase start 206-7 (FIG. 9B) provides a signal to phase detector circuit 206-10 and pulse gate circuit 206-8. The output signals from circuits 206-7 and 206-8 also drive phase detector circuit 206-10. A VCO circuit 206-11, in response to the output signal of phase detector 206-10, generates a code read clock signal. In response to a signal from delay circuit 206-9, bit latch circuit 206-12 provides a code read data signal.

Gate array 111 (FIGS. 10A to 10D) is described more completely in copending and commonly assigned U.S. patent application No. 07/766,480 of Morehouse et al. filed on Sep. 25, 1991 and entitled "Microminiature Hard Disk Drive," which is incorporated herein by reference in its entirety.

Figure 11:
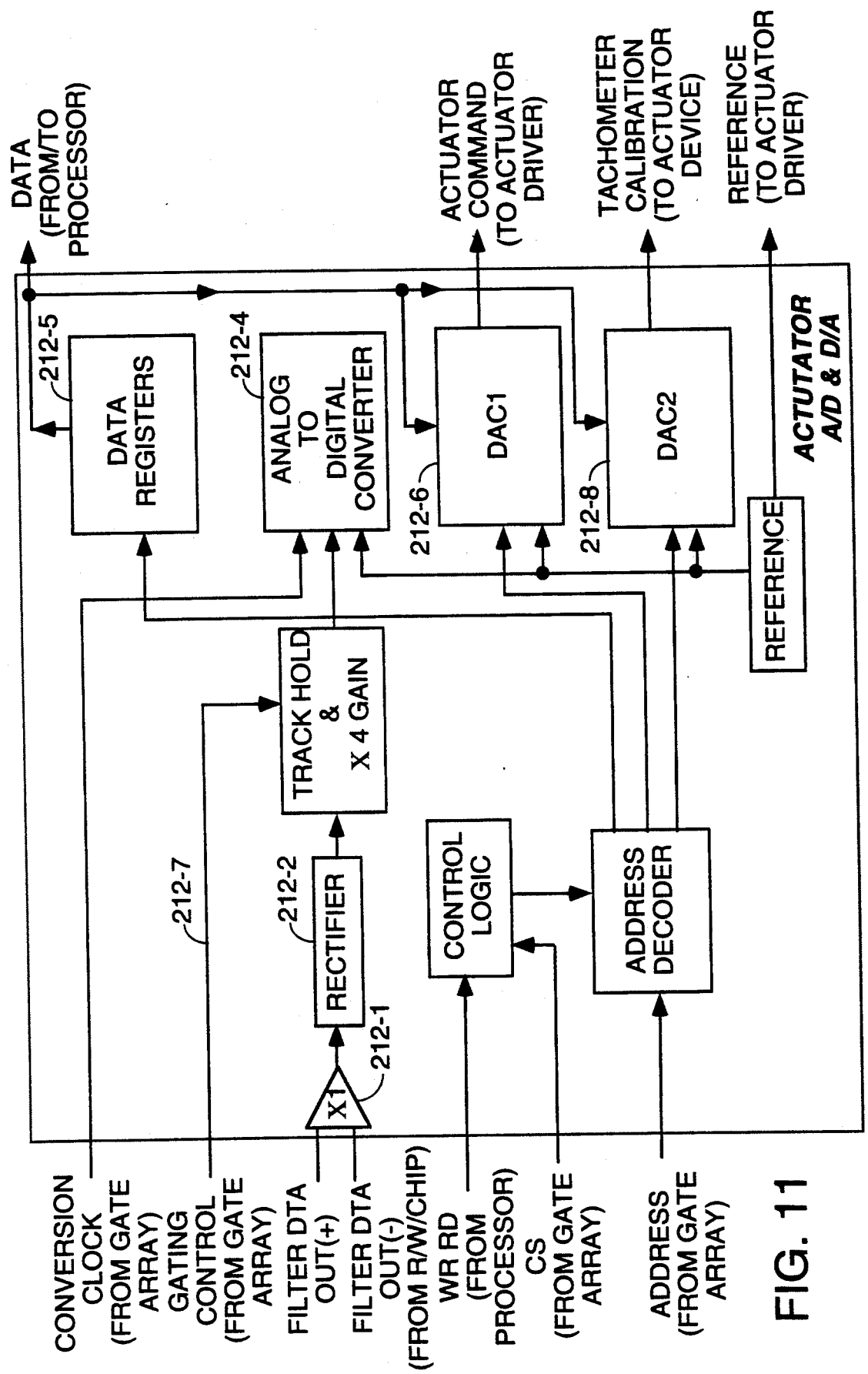
FIG. 11 is a block diagram of one embodiment of an actuator A/D and D/A circuit suitable for use in a disk drive having the novel interleaved embedded servo system of this invention.

In actuator A/D and D/A circuit 212 (FIG. 11), the filtered signals from read/write combo circuit 206 are first passed through a unity gain differential amplifier 212-1 and then rectified by rectifier 212-2. The output signal from rectifier is sampled by track hold circuit 212-3 which contains four sample and hold circuits at predetermined times, that are controlled by gating control line 212-7 from gate array 211 (FIGS. 10A to 10D). The four signals from track hold circuit 212-3 are sequentially converted to digital signals by analog to digital converter 212-4, stored in data registers 212-5, and read by microcontroller 210. The four signals represent the peak voltage levels of the position sub-field Na, Nb, Qa, and Qb waveforms. Microcontroller 110 processes the four signals and computes a position error. Microcontroller 110 then generates a correction signal which is sent through data lines to digital-to-analog converter 212-6 which in turn is converted to an analog signal. The output signal of D/A converter 212-6 is provided to actuator driver circuit 113.

Actuator A/D and D/A circuit 212 also generates a tachometer calibration signal and a reference signal that are provided to actuator driver circuit 213. In one embodiment, actuator circuit 212 is an integrated circuit available from Analog Devices of Norwood, MASS. as part number ADC 7773.

Figure 12A:
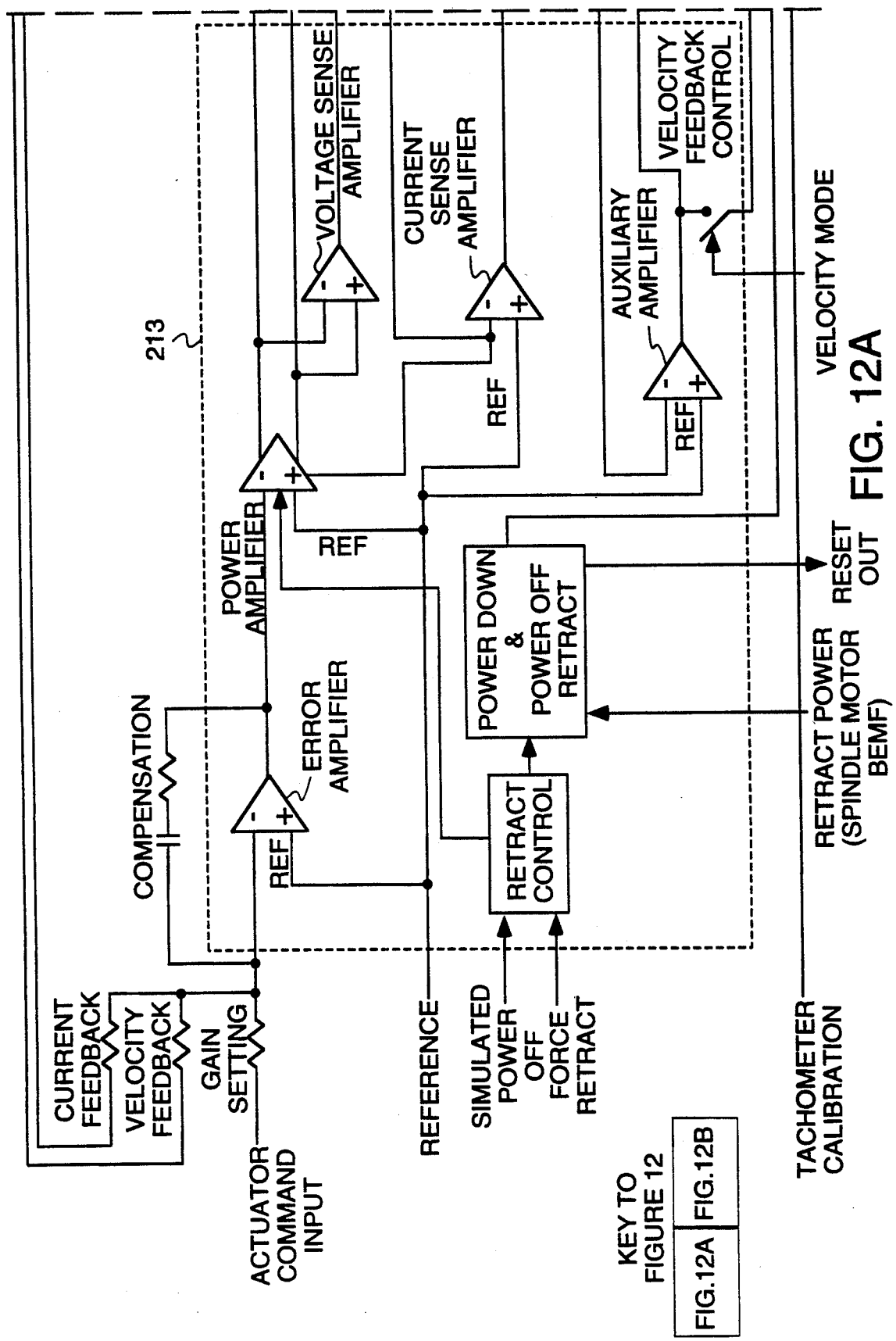
FIGS. 12A and 12B are a block diagram of one embodiment of an actuator driver circuit suitable for use in a disk drive having the novel interleaved embedded servo system of this invention.
Figure 12B:
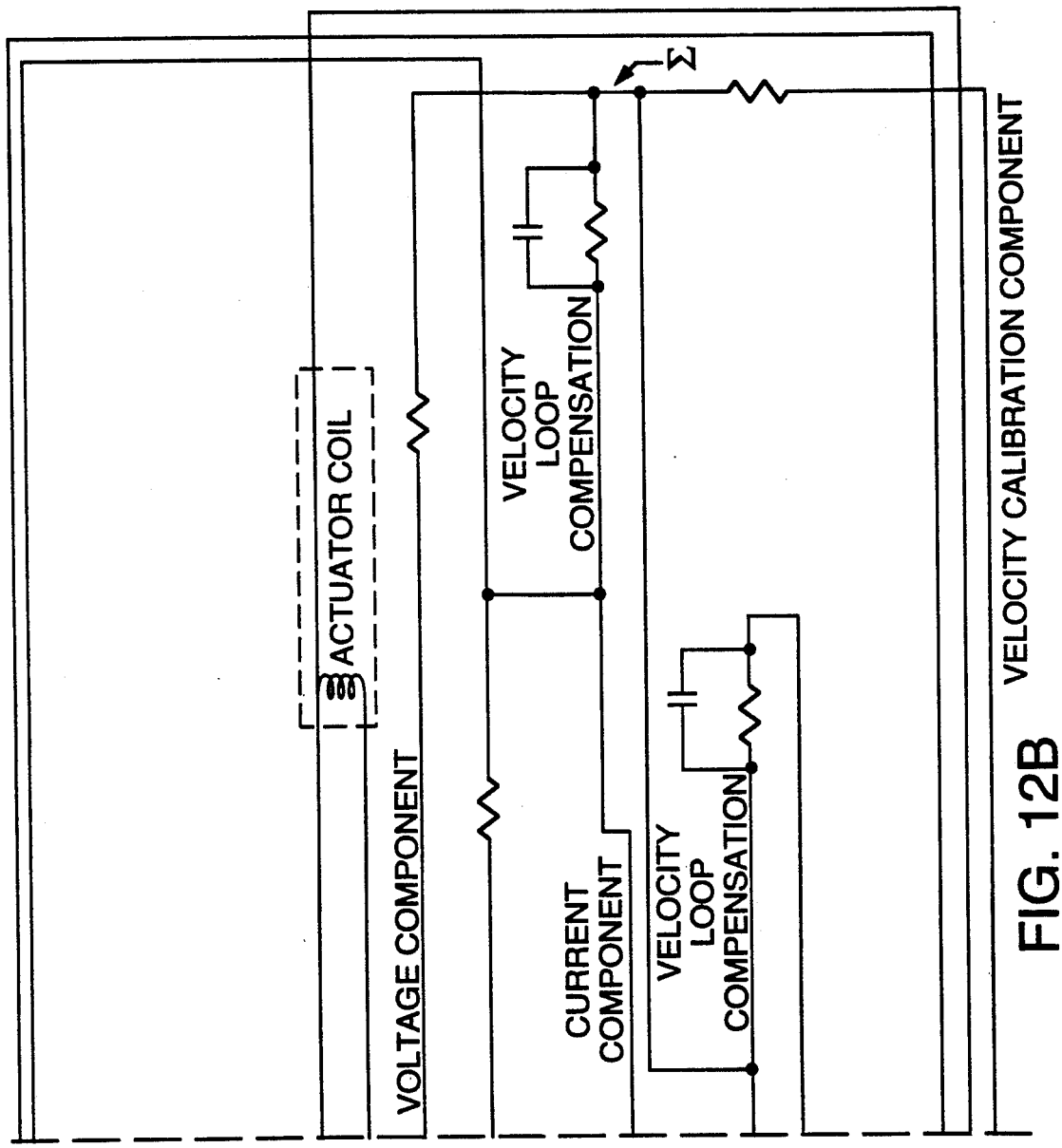

Actuator drive circuit 213 (FIG. 12A and 12B) in response to the signals from actuator circuit 212 moves the read/write head to the predetermined location over the disk. In one embodiment, actuator driver circuit includes an integrated circuit available from Allegro Micro System, Inc., of Worcester, Mass. as part number 8932.

Figure 13:
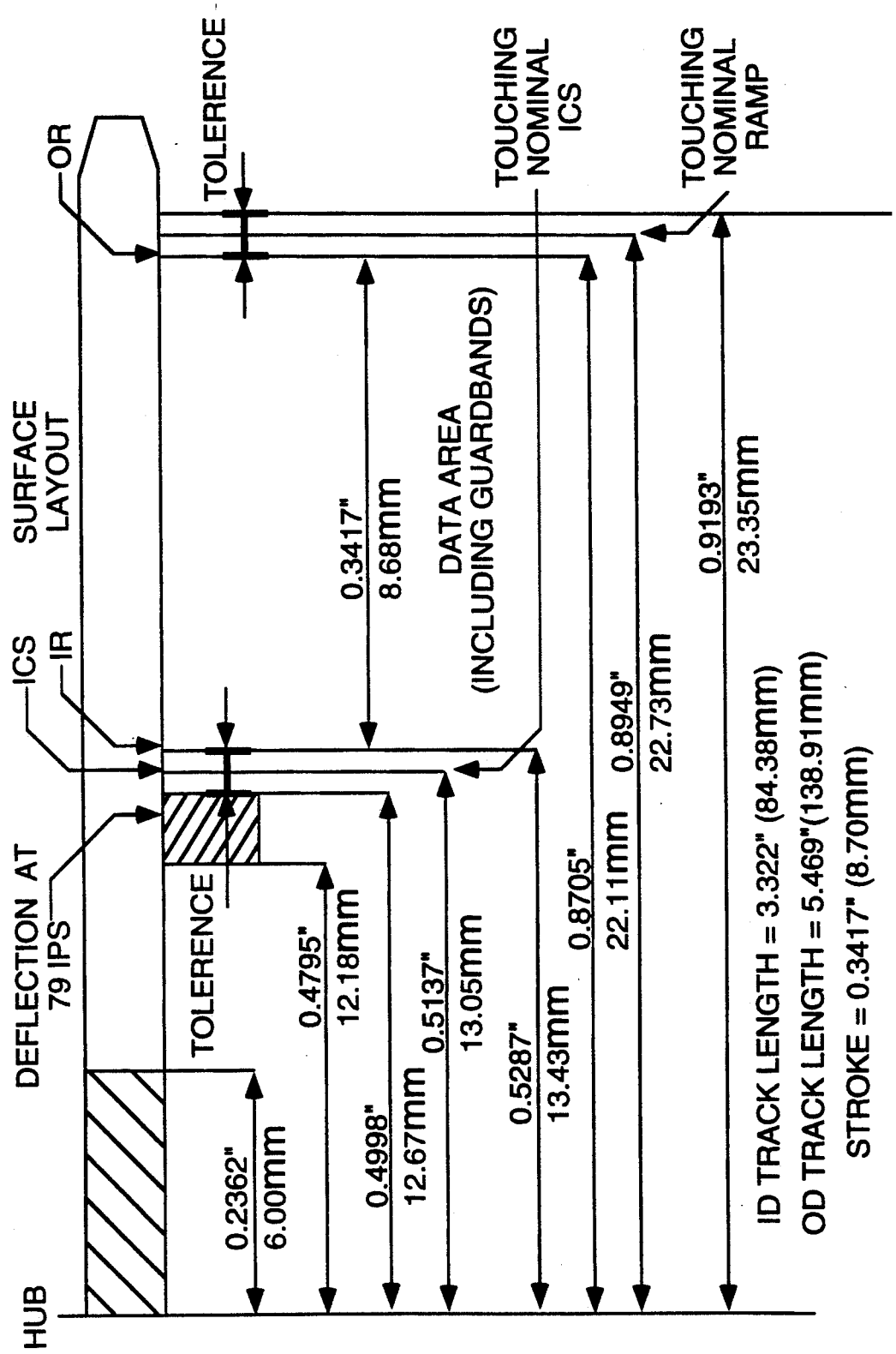
FIG. 13 is a cross-sectional view of one disk on which the prerecorded interleaved embedded servo system of this invention is used.

FIG. 13 is a cross-sectional view of a disk on which the prerecorded embedded servo system of this invention is used in one embodiment Inter radius IR of the disk data is about 13.4 mm and outer radius OR of the data area is about 22.1 mm. Hence, the data area of the disk including guard bands at the inner and outer radii is about 8.7 mm. The disk has a density of about 40,000 bpi and 1550 tracks per inch. The disk is mounted on a hub of about 6 mm in radius. Inner crash stop ICS is at about a radius of 12.7 mm and is nominally touched at a radius of about 13.1 mm. Loading/unloading ramp 203 (FIG. 2) is nominally touched at a radius of about 22.7 mm.

The above embodiments are only illustrative of the principles of this invention and are not intended to limit the invention to the particular embodiments described For example, the embedded servo fields of this invention may be used in a read only system or in a system that uses other than a magnetic medium. These and other applications will be apparent to those skilled in the art in view of this disclosure.

I claim:

1. A method, that is immune to single bit errors, for synchronizing a read/write head to a rotating disk having embedded servo fields wherein each embedded servo field includes a DC erased gap follow by a first synchronization pulse which in turn is followed by a second synchronization pulse, said method comprising the steps of:

detecting a synchronization pulse within a sector preceding a first sector;
   qualifying a DC erased gap of the first sector;
   opening a first sector reference window a predetermined time following the synchronization pulse of the sector preceding said first sector;
   opening a first DC gap reference window after qualification of the DC erased gap;
   using a first synchronization pulse of said first sector for synchronization when said first synchronization pulse occurs while both said first DC gap reference window and said first sector reference window are open.

2. The method of claim 1 where when said first synchronization pulse occurs while only said first DC gap reference window is open, said first synchronization pulse is used for synchronization and an error flag is set.

3. The method of claim 1 wherein when said first synchronization pulse fails to occur while said first DC gap reference window is open, said method further comprising the steps of:
   opening a second sector reference window a predetermined time following the synchronization pulse of the sector preceding said first sector;
   opening a second DC gap reference window after qualification of the DC erased gap;
   using said second synchronization pulse for synchronization when said second synchronization pulse occurs while said second DC gap reference window is open.

4. The method of claim 1 wherein the step of qualifying the DC erased gap comprises determining that the servo field has failed to generate a pulse for a time longer than any naturally occurring DC erased gap in said servo field when bounded by a single missing bit.

5. The method of claim 1 wherein the width of the first DC gap reference window is a length of time the first DC gap reference window is open and further wherein the width of the first DC gap reference window is selected to that information in a position subfield of the servo field of the first sector is read properly.

6. The method of claim 1 wherein the width of the first DC gap reference window is selected to compensate for normal variations in sampling the start of the DC erased gap.

7. The method of claim 1 wherein the width of the first sector reference window is substantially equal to a width W2 where width W2 satisfies the relationship:

$$W2 = (120/S) * (1/(\text{Sectors})) * (V/100)$$

wherein S is a spin motor speed in revolutions per minute, V is allowed variation in the spine motor speed expressed in percent, and Sectors is the number of sectors in a track.

8. The method of claim 3 where said second DC gap reference window is initially opened so that the second DC gap reference window overlaps with the first DC gap reference window when the last bit of a servo subfield is lost immediately preceding the DC erased gap and a sampling error occurs in determining the start of the DC erased gap.

9. The method of claim 8 wherein the width of the second gap reference window is a length of time the first DC gap reference window is open and further wherein the width of the second DC gap reference window is selected to that the second DC gap reference window is at least one clock period of a counter used to qualify the DC erased gap after the peak of the second synchronization pulse when the last bit of a servo subfield is lost immediately preceding the DC erased gap.

10. The method of claim 1 where the step of opening a first DC gap reference window is performed only for a subset of the servo fields in a track thereby reducing power consumption.

* * * * *